(12) United States Patent
Araki et al.

(10) Patent No.: US 10,496,044 B2
(45) Date of Patent: Dec. 3, 2019

(54) SATELLITE RADIO-CONTROLLED WATCH

(71) Applicant: CITIZEN WATCH CO., LTD., Tokyo (JP)

(72) Inventors: Masayuki Araki, Nishitokyo (JP); Kohichi Kazahari, Higashikurume (JP); Takashi Ihara, Nishitokyo (JP)

(73) Assignee: Citizen Watch Co., LTD., Tokyo (JP)

( * ) Notice: Subject to any disclaimer, the term of this patent is extended or adjusted under 35 U.S.C. 154(b) by 0 days.

(21) Appl. No.: 15/539,685

(22) PCT Filed: Dec. 11, 2015

(86) PCT No.: PCT/JP2015/084849
§ 371 (c)(1),
(2) Date: Jun. 25, 2017

(87) PCT Pub. No.: WO2016/104199
PCT Pub. Date: Jun. 30, 2016

(65) Prior Publication Data
US 2017/0357222 A1  Dec. 14, 2017

(30) Foreign Application Priority Data
Dec. 26, 2014  (JP) .................. 2014-264880

(51) Int. Cl.
*G04R 20/04* (2013.01)
*G01S 19/13* (2010.01)
(Continued)

(52) U.S. Cl.
CPC .............. *G04R 20/04* (2013.01); *G01S 19/13* (2013.01); *G04G 5/002* (2013.01); *G04R 60/06* (2013.01)

(58) Field of Classification Search
CPC .... G04B 19/22; G04B 19/221; G04B 19/223; G04B 19/225; G04B 19/226;
(Continued)

(56) References Cited

U.S. PATENT DOCUMENTS 6,278,660 B1 * 8/2001 Tognazzini .......... G04G 9/0076
  368/21
6,304,212 B1 * 10/2001 Aoki ....................... G01S 19/13
  342/357.52

(Continued)

FOREIGN PATENT DOCUMENTS

CN      101617278 A      12/2009
CN      102323743 A       1/2012
(Continued)

OTHER PUBLICATIONS

Megner, Guenter, English Translation of Wo 2006117059, originally published Nov. 9, 2006, retrieved from Espacenet on Dec. 21, 2018, full document (Year: 2006).*

(Continued)

*Primary Examiner* — Daniel P Wicklund
(74) *Attorney, Agent, or Firm* — HEA Law PLLC

(57) ABSTRACT

A satellite radio-controlled watch, including a receiving unit for receiving a satellite radio wave containing time information and position information; a storage unit for storing intersection point information indicating a position of an intersection point between a reference line along a great circle orthogonal to a specific great circle on the earth or a reference line along the specific great circle on the earth or a circle parallel to the great circle and a time zone boundary, and time difference division information on a wedge-shaped or belt-shaped area that is adjacent to the reference line and to which the intersection point belongs, and a time zone determination unit for determining a time zone, based on the position information, the intersection point information, and the time difference division information.

16 Claims, 22 Drawing Sheets

(51) Int. Cl.
*G04G 5/00* (2013.01)
*G04R 60/06* (2013.01)
(58) Field of Classification Search
CPC .... G04B 19/228; G04B 19/23; G04B 19/235; G04R 20/00; G04R 20/02
See application file for complete search history.

(56) References Cited

U.S. PATENT DOCUMENTS

| | | | | |
|---|---|---|---|---|
| 7,965,937 | B2* | 6/2011 | Nishikawa | G04G 9/0076 396/310 |
| 9,134,427 | B2* | 9/2015 | McIntosh | G01S 19/14 |
| 2009/0135675 | A1* | 5/2009 | Akiyama | G04G 9/0076 368/14 |
| 2009/0190444 | A1* | 7/2009 | Akiyama | G04R 20/06 368/14 |
| 2010/0057349 | A1 | 3/2010 | Akiyama | |
| 2010/0074059 | A1 | 3/2010 | Hasumi et al. | |
| 2010/0228948 | A1* | 9/2010 | Jaekwan | G04R 20/06 711/221 |
| 2011/0280108 | A1* | 11/2011 | Honda | G04R 20/06 368/21 |
| 2016/0021501 | A1* | 1/2016 | Sambongi | H04W 4/021 455/456.3 |
| 2017/0133382 | A1* | 5/2017 | Ruzicka | G04G 9/0076 |

FOREIGN PATENT DOCUMENTS

| | | | |
|---|---|---|---|
| CN | 103076738 A | 5/2013 | |
| EP | 1014235 A2 * | 6/2000 | ........... G04G 9/0076 |
| EP | 2085835 A2 | 8/2009 | |
| JP | S63-250584 A | 10/1988 | |
| JP | H08-068848 A | 3/1996 | |
| JP | 2010-060455 A | 3/2010 | |
| JP | 2010-210276 A | 9/2010 | |
| WO | 2006/117059 A2 | 11/2006 | |

OTHER PUBLICATIONS

English translation of the International Search Report for PCT/JP2015/084849.
Search Report dated Aug. 24, 2018, for corresponding EP Patent Application No. 15872768.5.

* cited by examiner

FIG.9

| TIME DIFFERENCE DIVISION | TIME ZONE | SUMMER TIME | TOWN |
|---|---|---|---|
| 0 | UTC+0 | NA | A |
| 1 | UTC+1 | ST1~ED1,+1 | B |
| 2 | UTC+1 | ST2~ED2,+0.5 | C |
| | | | |

32c

SATELLITE RADIO-CONTROLLED WATCH

CROSS REFERENCE TO RELATED APPLICATIONS

This application is a National Stage of International Application No. PCT/JP2015/084849 filed on Dec. 11, 2015, which claims priority from Japanese Patent Application 2014-264880, filed on Dec. 26, 2014. The contents of the above documents are incorporated herein by reference in their entirety.

TECHNICAL FIELD

The present invention relates to a satellite radio-controlled watch.

BACKGROUND ART

A satellite radio-controlled watch that receives a satellite radio wave containing time information and position information to correct time, and further automatically determines a time zone, based on the position information obtained from the satellite radio wave has been put into practice. Automatic determination of a time zone requires determination of a time zone to which the current position belongs.

Patent Literature 1 mentioned below discloses an electronic device that receives a satellite radio wave sent from a position information satellite to obtain position information and time information, in which only one time difference data is assigned to each of the segments having the same size, block data that is a collection of a predetermined number of segments is stored without overlap, and time difference data on a segment corresponding to the position information is obtained in the block data.

CITATION LIST

Patent Literature

Patent Literature 1: Japanese Patent Laid-open Publication No. 2010-210276A

SUMMARY OF INVENTION

Technical Problem

A time zone boundary does not always extend along a line of longitude but may bend complicatedly due to a national border or terrain. Thus, determination of a time zone to which a satellite radio-controlled watch belongs requires data for enabling determination of a time zone to which any point on the ground surface belongs. As such data, assume data obtained by meshing the ground surface into sufficiently small portions with a time zone assigned to each thereof. This may enable determination of a time zone, but may require a huge storage capacity, which increases a computing load. This is thus not preferable in view of costs and power consumption.

Regarding this point, according to Patent Literature 1, a predetermined number of segments (meshed portions) are put together to make block data, and a correlation between a block corresponding to position information and a memory address corresponding to the block is stored. With the above, block data of time difference data having the same alignment are put together to thereby reduce data volume. According to this method, reduction of data volume to some extent is expected by setting an appropriate block size and putting together the blocks. However, requirement of a huge storage capacity remains as time different data should be held for every meshed portion obtained by dividing the ground surface.

The present invention has been conceived in view of the above, and the object of the present invention is to provide a satellite radio-controlled watch having smaller storage capacity for storing information for determining a time zone, based on position information.

Solution to Problem

The present invention disclosed in this application in order to achieve the above described object has various aspects, with representative aspects outlined below.

(1) A satellite radio-controlled watch includes a receiving unit for receiving a satellite radio wave containing time information and position information; a storage unit for storing intersection point information indicating a position of an intersection point between a reference line along a great circle orthogonal to a specific great circle on the earth or a reference line along the specific great circle on the earth or a circle parallel to the great circle and a time zone boundary, and time difference division information on a wedge-shaped or belt-shaped area that is adjacent to the reference line and to which the intersection point belongs; and a time zone determination unit for determining a time zone, based on the position information, the intersection point information, and the time difference division information.

(2) The satellite radio-controlled watch according to (1) may further include a time difference detail determination unit for determining at least either one of summer time and a town, based on at least the position information, the intersection point information, and the time difference division information.

(3) In the satellite radio-controlled watch according to (1) or (2), the storage unit may store at least address information containing an address indicating at least either one of the time difference division information and the intersection point information for every reference line, and time difference division and intersection point information containing the time difference division information and the intersection point information for every reference line to which the time difference division information and the intersection point information belong, so as to be referred to by using the address.

(4) In the satellite radio-controlled watch according to (3), the storage unit may store adjacent intersection point information that makes a pair with the intersection point information.

(5) In the satellite radio-controlled watch according to (3) or (4), the address may be a head address of the time difference division information and the intersection point information for every reference line to which the time difference division information and the intersection point information belong, and the time difference division and intersection point information may contain a reference mark indicating an end of data for every reference line to which the time difference division and intersection point information belongs.

(6) In the satellite radio-controlled watch according to any one of (1) to (5), the storage unit may store time difference detail information containing time zone information and at least either one of summer time information and town information associated with the time difference division information.

(7) In the satellite radio-controlled watch according to anyone of (1) to (6), the specific great circle may be the equator.

(8) In the satellite radio-controlled watch according to any one of (1) to (7), the area may be defined by two adjacent reference lines and lines orthogonal to the reference lines.

(9) The satellite radio-controlled watch according to (8) may further include an exceptional processing range setting unit for setting a range as an exceptional processing range, the range containing the intersection point, and defined by two adjacent reference lines and lines apart from each other by a predetermined distance and orthogonal to the two reference lines, wherein the time zone determination unit may maintain the time zone unchanged when a position indicated by the position information is located inside the exceptional processing range.

(10) In the satellite radio-controlled watch according to any one of (1) to (9), the storage unit may store second intersection point information indicating a position of a second intersection point that is an intersection point between the boundary and a second reference line adjacent to a first reference line, so as to be associated with first intersection point information indicating a position of a first intersection point that is an intersection point between the first reference line and the boundary, and the range may be defined by the first reference line, the second reference line, and a line connecting the first intersection point and the second intersection point.

(11) The satellite radio-controlled watch according to (10) may further include an exceptional processing range setting unit for defining a predetermined range containing the intersection point as an exceptional processing range, wherein the time zone determination unit may maintain the time zone unchanged when a position indicated by the position information is located inside the exceptional processing range.

(12) In the satellite radio-controlled watch according to (11), the exceptional processing range may be a range defined by two adjacent reference lines, a line passing through the first intersection point and orthogonal to the reference lines, and a line passing through the second intersection point and orthogonal to the reference lines.

(13) In the satellite radio-controlled watch according to (11), the exceptional processing range may be a range defined by two adjacent reference lines, a line parallel to a line connecting the first intersection point and the second intersection point and passing through the first intersection point, and a line parallel to the line connecting the first intersection point and the second intersection point and passing through the second intersection point.

(14) In the satellite radio-controlled watch according to any one of (1) to (13), the time zone determination unit may determine whether to maintain the time zone unchanged or to set a specific time zone when the time zone information associated with the time difference division information indicates a time zone not set.

(15) The satellite radio-controlled watch according to any one of (1) to (14) may further include a high latitude processing unit for maintaining the time zone unchanged or set a specific time zone when a position indicated by the position information is at a predetermined latitude or above.

Advantageous Effects of Invention

According to the aspect (1) of the present invention, there can be provided a satellite radio-controlled watch with a smaller storage capacity for storing information for determining a time zone, based on the position information.

According to the aspect (2) of the present invention, there can be provided a satellite radio-controlled watch that determines a time difference that is more finely defined than the time zone.

According to the aspect (3) of the present invention, there can be provided a satellite radio-controlled watch in which the time difference division information and the intersection point information are stored without overlap.

According to the aspect (4) of the present invention, there can be provided a satellite radio-controlled watch that determines a time zone with higher accuracy, based on the position information.

According to the aspect (5) of the present invention, there can be provided a satellite radio-controlled watch that stores as variable-length data the information for determining a time zone, based on the position information.

According to the aspect (6) of the present invention, there can be provided a satellite radio-controlled watch that stores a time difference that is more finely defined than the time zone.

According to the aspect (7) of the present invention, there can be provided a satellite radio-controlled watch that uses a line of latitude or a line of longitude as a reference line.

According to the aspect (8) of the present invention, there can be provided a satellite radio-controlled watch in which an intersection point between a reference line and a time zone boundary has one-to-one correspondence to a time difference division.

According to the aspect (9) of the present invention, there can be provided a satellite radio-controlled watch in which the time difference remains unchanged within a predetermined range containing a time zone boundary.

According to the aspect (10) of the present invention, there can be provided a satellite radio-controlled watch in which an area with a time difference division set thereto more faithfully to a time zone boundary is defined.

According to the aspect (11) of the present invention, there can be provided a satellite radio-controlled watch in which the time difference remains unchanged near a time zone boundary.

According to the aspect (12) of the present invention, there can be provided a satellite radio-controlled watch in which the time difference remains unchanged in a range containing a time zone boundary and enclosed by two lines orthogonal to the reference lines.

According to the aspect (13) of the present invention, there can be provided a satellite radio-controlled watch in which the time difference remains unchanged in a range containing a time zone boundary and defined by a line connecting intersection points each between a reference line and a time zone boundary.

According to the aspect (14) of the present invention, there can be provided a satellite radio-controlled watch capable of indicating time also when a time zone is not set.

According to the aspect (15) of the present invention, there can be provided a satellite radio-controlled watch that prevents frequent time correction.

BRIEF DESCRIPTION OF DRAWINGS

FIG. 9 shows time difference detail information stored in a satellite radio-controlled wristwatch according to the first embodiment of the present invention.

DESCRIPTION OF EMBODIMENTS

In the following, embodiments of the present invention will be described with reference to the accompanying drawings.

[First Embodiment]

Figure 1:
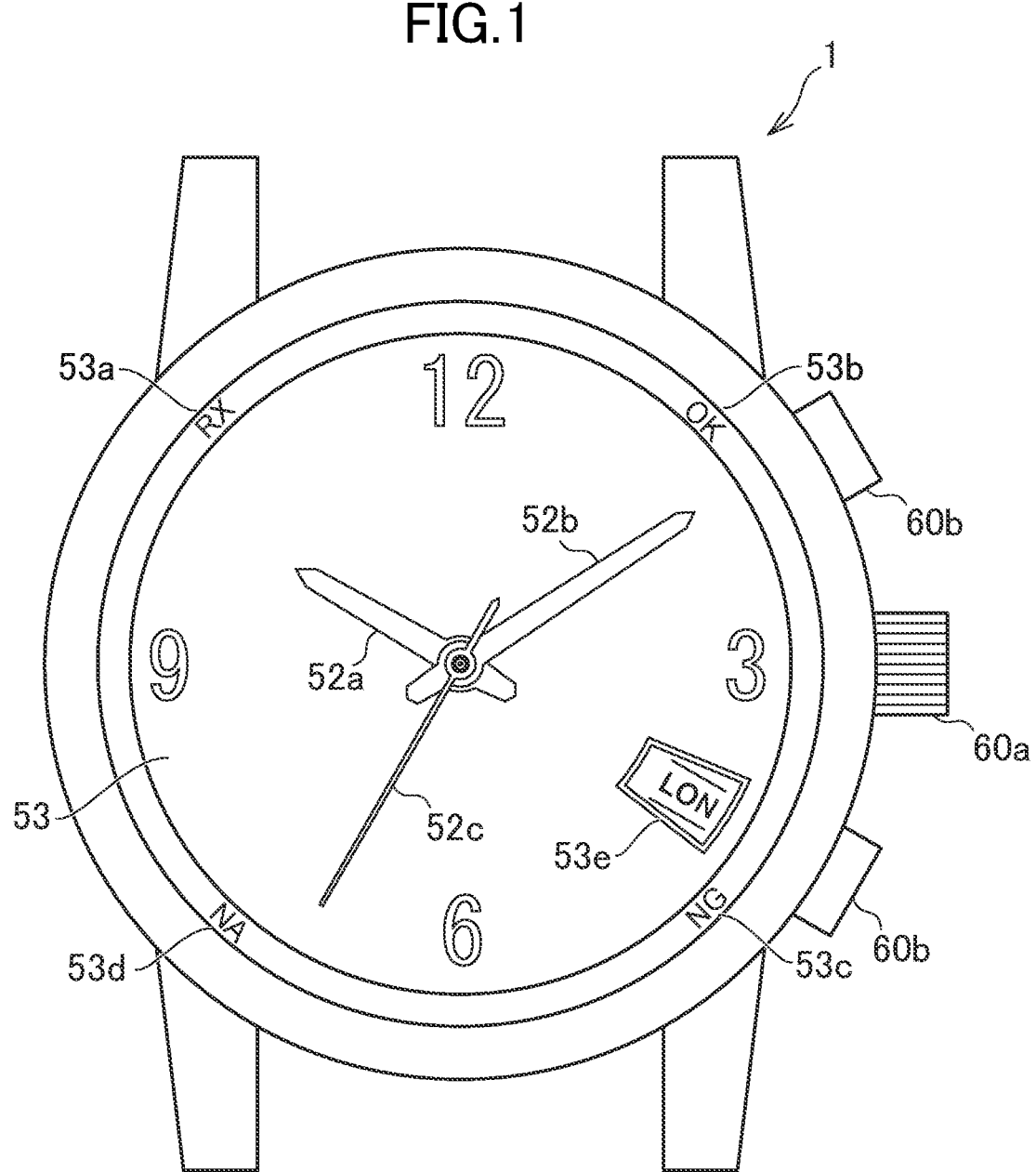
FIG. 1 is a plan view showing one example of an external appearance of a satellite radio-controlled wristwatch according to a first embodiment of the present invention.

FIG. 1 is a plan view showing one example of an external appearance of a satellite radio-controlled wristwatch 1 according to a first embodiment of the present invention. This drawing shows a dial plate 53 disposed in the body, or an outer case (a watch case), of the satellite radio-controlled wristwatch 1 and indicating hands for indicating time, namely, an hour hand 52a, a minute hand 52b, and a second hand 52c. On the lateral surface of the body on the three o'clock side, a button 60a and a push button 60b, which are operational units 60 for operation by a user of the satellite radio-controlled wristwatch 1, are arranged.

The satellite radio-controlled wristwatch 1 has a windshield made of transparent material such as glass and attached to its body so as to cover the dial plate 53. On the opposite side of the satellite radio-controlled wristwatch 1 from the windshield, a rear cap is attached to the body. In this specification, the side where the windshield of the satellite radio-controlled wristwatch 1 is disposed (the side of the paper showing FIG. 1 closer to the reader) will be hereinafter referred to as a front side, while the side where the rear cap is attached (the side of the paper showing FIG. 2 farther from the reader) as a rear side.

The dial plate 53 has a solar cell 42 disposed on its rear side for generating power using light incident from the front side. For the generation, the dial plate 53 is made of material having some extent of light permeability. In an area not overlapping the solar cell 42, a patch antenna for receiving a satellite radio wave is disposed. The front surface of the patch antenna constitutes a receiving surface for receiving an electric wave from a satellite. The receiving surface of the patch antenna, the light receiving surface of the solar cell 42, and the dial plate 53 are placed in parallel with one another, and oriented to the front side. The patch antenna may be substituted by a chip antenna or an inverted-F antenna.

In this specification, the term "satellite radio-controlled wristwatch" refers to a wristwatch that has a function for receiving a satellite signal from a satellite, such as a Global Position System (GPS) satellite, that sends information on time and date (time information) and for correcting internal time, or information on time held inside the wristwatch, based on the time information contained in the received satellite signal. However, the present invention is not limited to a satellite radio-controlled wristwatch, and may be applied to a small watch that is not a wristwatch, such as, a pocket watch, for example. Additionally, the satellite radio-controlled wristwatch receives position information contained in the satellite signal. A satellite that sends the satellite signal received by the satellite radio-controlled wristwatch may be a satellite that is used, or is planned to be used, as other than a GPS satellite, and may be, for example, Global Navigation Satellite System (GLONASS), Galileo, or COMPASS (BDS).

The satellite radio wave sent from a GPS satellite is an electric wave subjected to phase-shifting keying applied to a carrier wave (an electric wave in L1 band) at frequency of about 1.6 GHz. A signal encoded into a satellite radio wave is a signal obtained by superposing a pseudo random number (PRN) unique to each GPS satellite and a satellite signal containing time information. The satellite radio-controlled wristwatch 1 receives a plurality of satellite radio waves sent from a plurality of satellites, and determines correlation to the PRN of which satellite is large to thereby determine which satellite has sent each of the plurality of satellite radio waves received. In this specification, such satellite determination processing is referred to as locking on a satellite radio wave. A satellite signal contains time information. The time information includes Time of Week (TOW) indicating the current time expressed with the start of a week (0:00 a.m. on Sunday) as the start point and WN indicating that the current time is on the $n^{th}$ week when counted from a predetermined reference time. Thus, the satellite radio-controlled wristwatch 1 receives only TOW or TOW and the week number WN, depending on a situation. As the GPS time includes a difference relative to Coordinated Universal Time (CUT) due to a leap second, a GPS satellite sends leap second information to correct this difference. Thus, the satellite radio-controlled wristwatch 1 receives not only the time information but also the leap second information from the GPS satellite. A satellite signal additionally contains position information. The position information includes almanacs, or information on the positions of all satellites, and ephemeris, or information on the position of each satellite. The satellite radio-controlled wristwatch 1 calculates respective distances from a plurality of GPS satellites orbiting above in the sky, based on the received position information, to calculate the latitude, longitude, and altitude of the current position.

In the example of the satellite radio-controlled wristwatch 1 shown in FIG. 1, a receipt-on-progress character 53a, or "RX", a successful receipt character 53b, or "OK", a failed receipt character 53c, or "NG", a no-setting processing character 53d, or "NA", are shown along the circumference of the dial plate 53. The successful receipt character 53b and the failed receipt character 53c are indexes that indicate, by using the second hand 52c, for example, whether or not receiving processing by the satellite radio-controlled wristwatch 1 has been successfully completed. The receipt-on-progress character 53a is an index that indicates that receiving processing is ongoing. The no-setting processing character 53d is an index that indicates that no-setting processing to be described later in detail has been executed. An operation for showing the result of previous receiving processing may be executed using these indexes prior to execution of receiving processing.

A town indication 53e indicates a representative town in the time zone currently set. In the example shown in FIG. 1, the letters "LON" indicate London as a representative town. Besides, whether or not summertime is currently effective may be indicated. For example, whether or not summer time is effective in the time zone currently set may be indicated by using the second hand 52c, for example, or any other auxiliary hand separately provided.

The design of the satellite radio-controlled wristwatch 1 shown in FIG. 1 is one example. Designs other than is shown here are applicable. For example, the body may not be round but rectangular. Presence or absence, the number, and arrangement of the button 60a and the pushbutton 60b are determined as desired. Although three indicating hands, namely, the hour hand 52a, the minute hand 52b, and the second hand 52c, are used in this embodiment, this is not an exclusive example. The second hand 52c may be omitted. Alternatively, any additional hands for indicating a day of the week, the current time zone, effective/ineffective of summer time, electric wave receiving condition, a remaining battery amount, or various indications, and a date indication, or the like, may be provided.

The body of the satellite radio-controlled wristwatch 1 incorporates a driving mechanism 50 for driving the indicating hands, a secondary cell 40 for storing power generated by the solar cell 42, a control circuit 30 for controlling operation of the satellite radio-controlled wristwatch 1, a receiving circuit 20 for processing a satellite signal received, or the like, as will be described later in detail.

Figure 2:
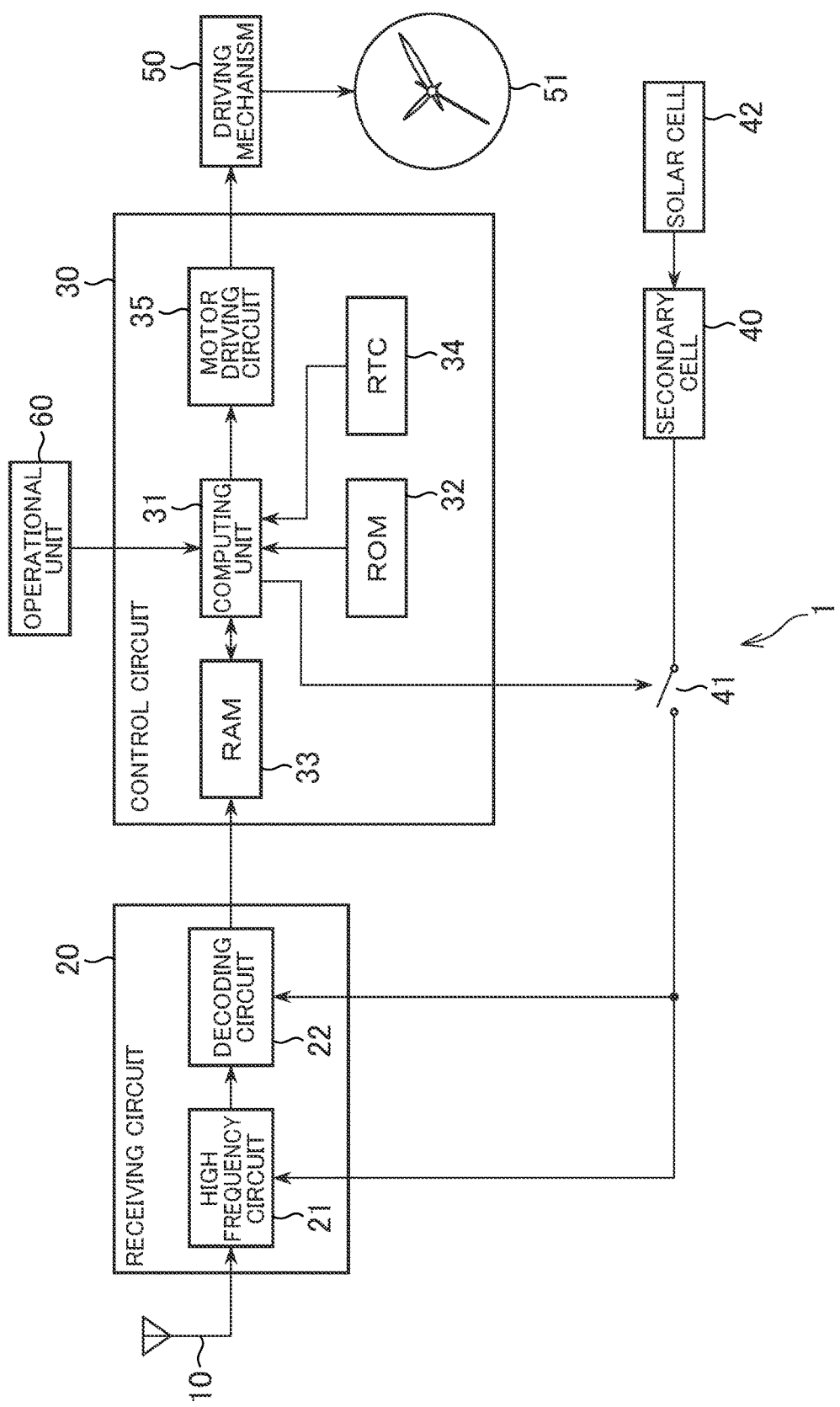
FIG. 2 is a structural block diagram showing an internal structure of a satellite radio-controlled wristwatch according to the first embodiment of the present invention.

FIG. 2 is a structural block diagram showing an internal structure of the satellite radio-controlled wristwatch 1. As shown in the drawing, the satellite radio-controlled wristwatch 1 includes an antenna 10, the receiving circuit 20, the control circuit 30, the secondary cell 40, a switch 41, the solar cell 42, the driving mechanism 50, a time display unit 51, and the operational unit 60.

The antenna 10 receives a satellite radio wave sent from a satellite as an electric wave containing time information. In this embodiment, in particular, the antenna 10 is a patch antenna that receives a satellite radio wave sent from a GPS satellite.

The receiving circuit 20 decodes the satellite radio wave received by the antenna 10 and outputs a bit string (received data) indicating the content of a satellite signal obtained by decoding. Specifically, the receiving circuit 20 includes a high frequency circuit (RF circuit) 21 and a decoding circuit 22.

The high frequency circuit 21 is an integrated circuit that operates at high frequency, and applies amplification and detection to an analog signal received by the antenna 10 to thereby convert into a baseband signal. The decoding circuit 22 is an integrated circuit that executes baseband processing, and specifically decodes the baseband signal outputted from the high frequency circuit 21 to thereby generate a bit string indicating the content of data received from a GPS satellite and outputs to the control circuit 30.

The control circuit 30 is an information processing device, such as a microcomputer, and includes a computing unit 31, a Read Only Memory (ROM) 32, a Random Access Memory (RAM) 33, a Real Time Clock (RTC) 34, and a motor driving circuit 35.

The computing unit 31 executes various information processing, based on a program stored in the ROM 32. Details of the processing executed by the computing unit 31 in this embodiment will be described later. The RAM 33 functions as a working memory of the computing unit 31, into which data to be processed by the computing unit 31 is written. In this embodiment, in particular, a bit string (received data) indicating the content of the satellite signal received by the receiving circuit 20 is sequentially written into a buffer area in the RAM 33. The RTC 34 supplies a clock signal for use in clocking inside the satellite radio-controlled wristwatch 1. In the satellite radio-controlled wristwatch 1 according to this embodiment, the computing unit 31 corrects the internal time clocked based on the signal supplied form the RTC 34, based on the satellite signal received by the receiving circuit 20, to determine a time (display time) to be displayed on the time display unit 51. Further, the motor driving circuit 35 outputs a drive signal to drive a motor included in the driving mechanism 50 to be described later, depending on the display time determined. With the above, time for indication generated by the control circuit 30 is displayed on the time display unit 51.

The secondary cell 40 is a battery for storing power generated by the solar cell 42, and is, for example, a lithium ion battery. The secondary cell 40 supplies the power stored therein to the receiving circuit 20 and the control circuit 30. On the way for supplying power from the secondary cell 40 to the receiving circuit 20, the switch 41 is provided. The switch 41 switches between on and off in response to a control signal outputted by the control circuit 30. That is, the control circuit 39 switches between on and off of the switch 41 to thereby control operation timing of the receiving circuit 20. The receiving circuit 20 operates only while power is supplied from the secondary cell 40 via the switch 41, and a satellite radio wave received by the antenna 10 is decoded while the receiving circuit 20 is operating.

The solar cell 42 is disposed on the rear side of the dial plate 53. The solar cell 42 generates power, using external light, such as sunlight, irradiating the satellite radio-controlled wristwatch 1, and supplies the generated power to the secondary cell 40.

The driving mechanism 50 includes a step motor that operates in response to a drive signal outputted from the motor driving circuit 35 described above, and a gear train. The gear train transmits rotation of the step motor to thereby cause the indicating hand 52 to turn. The time display unit 51 includes the indicating hand 52 and the dial plate 53. The indicating hand 52 includes the hour hand 52a, the minute hand 52b, and the second hand 52c. The indicating hand 52 turns around on the dial plate 53 to thereby indicate the current time.

The operational unit 60 includes, for example, the button 60a and the push button 60b, and receives a user operation of the satellite radio-controlled wristwatch 1 to output the content of the operation to the control circuit 30. In response to the content of operation input received by the operational unit 60, the control circuit 30 executes various processing. In this embodiment, in particular, the control circuit 30 executes processing for receiving a satellite signal in response to input of operation of the operational unit 60 by a user.

Figure 3:
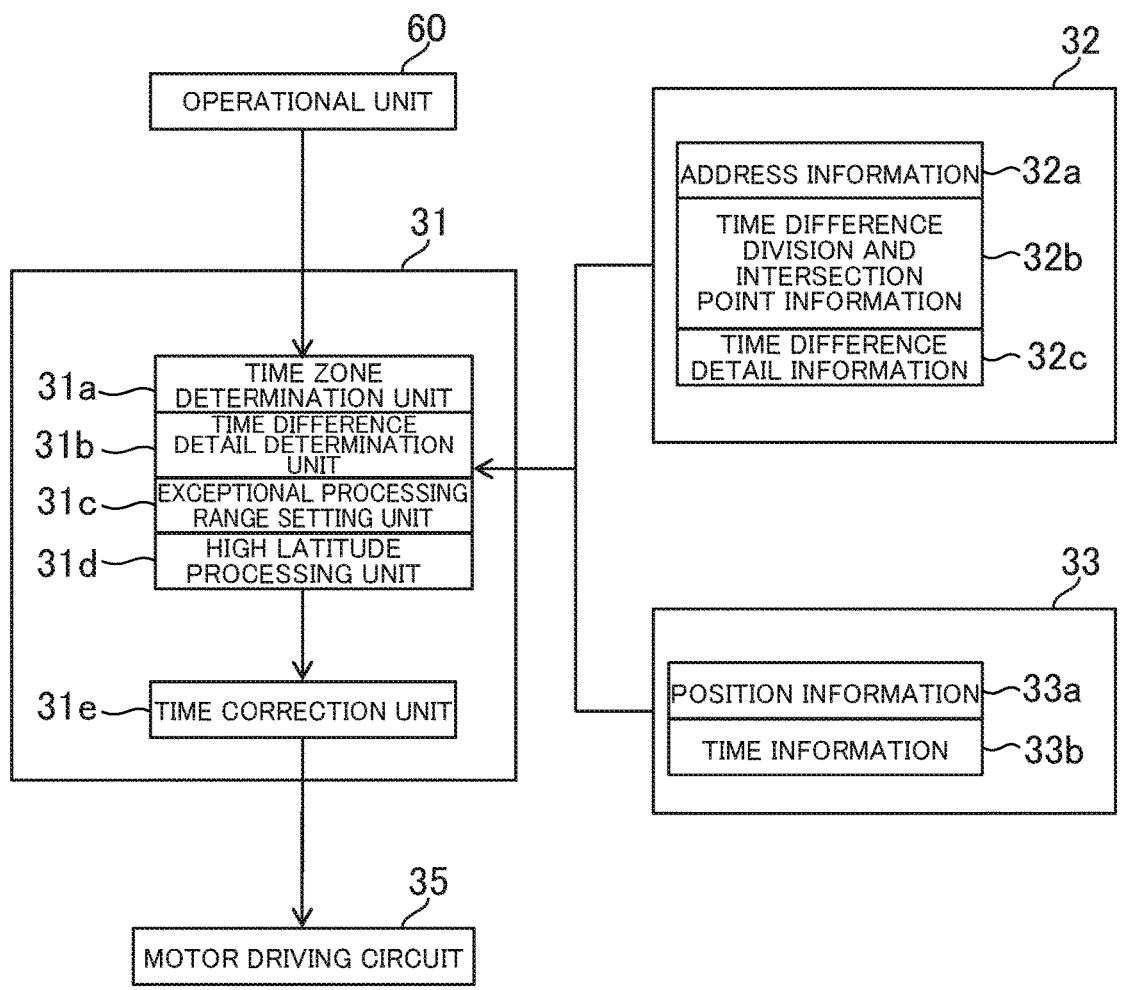
FIG. 3 is a functional block diagram showing functions implemented in a satellite radio-controlled wristwatch according to the first embodiment of the present invention.

The following describes a specific example of the processing executed by the computing unit 31 of the control circuit 30 in this embodiment. As shown in FIG. 3, the computing unit 31 executes the program stored in the ROM 32 to functionally implement a time zone determination unit 31a, a time difference detail determination unit 31b, an exceptional processing range setting unit 31c, a high latitude processing unit 31d, and a time correction unit 31e.

The time zone determination unit 31a determines a time zone to which the satellite radio-controlled wristwatch 1 belongs, based on the position information 33a stored in the RAM 33 and the time difference division information and the intersection point information contained in the time difference division and intersection point information 32b stored in the ROM 32. Note here that the ROM 32, or a storage unit, stores address information 32a for every reference line, that contains an address that indicates at least either one of the time difference division information and the intersection point information. Furthermore, the ROM 32 stores time difference division and intersection point information 32b that contains time difference division information and the intersection point information for every reference line to which the time difference division information and intersection point information belongs so as to be referred to by using an address. Still furthermore, the ROM 32 stores the time difference detail information 32c that contains time zone information and at least either one of summer time information and town information associated with the time difference division.

The time difference detail determination unit 31b determines at least either of a town or details on summer time, based on at least the position information, the intersection point information, and the time difference division information.

The exceptional processing range setting unit 31c sets a range for having the time zone determination unit 31a to execute exceptional processing. In the case where the position indicated by the position information 33a is located inside the exceptional processing range, the time zone determination unit 31a maintains the time zone unchanged.

In the case where the position indicated by the position information 33a is located at a predetermined latitude or above, the high latitude processing unit 31d either maintains the time zone unchanged or sets a specific time zone. In the satellite radio-controlled wristwatch 1 according to this embodiment, the high latitude processing unit 31d maintains the time zone unchanged when the position indicated by the position information 33a is located at latitude 80° or above N/S.

In response to the determination relevant to the time difference made by the time difference detail determination unit 31b, the time correction unit 31e corrects the internal time clocked inside the satellite radio-controlled wristwatch 1.

Figure 4:
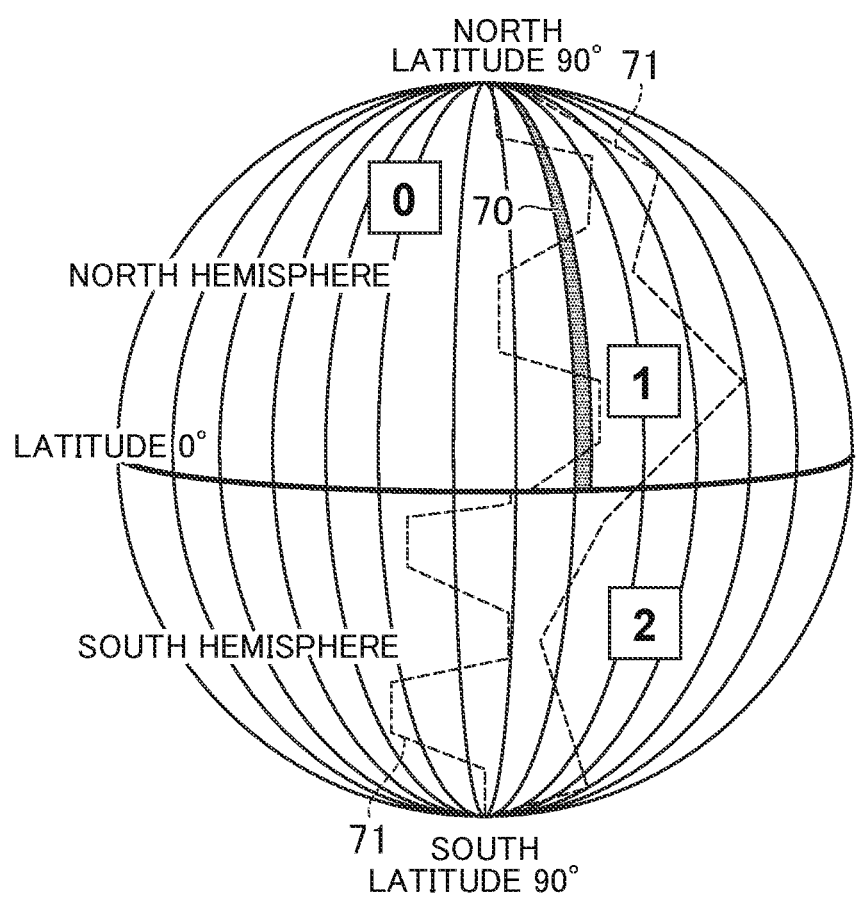
FIG. 4 is a schematic diagram showing a time zone boundary and a time difference division region employed in a satellite radio-controlled wristwatch according to the first embodiment of the present invention.
Figure 5:
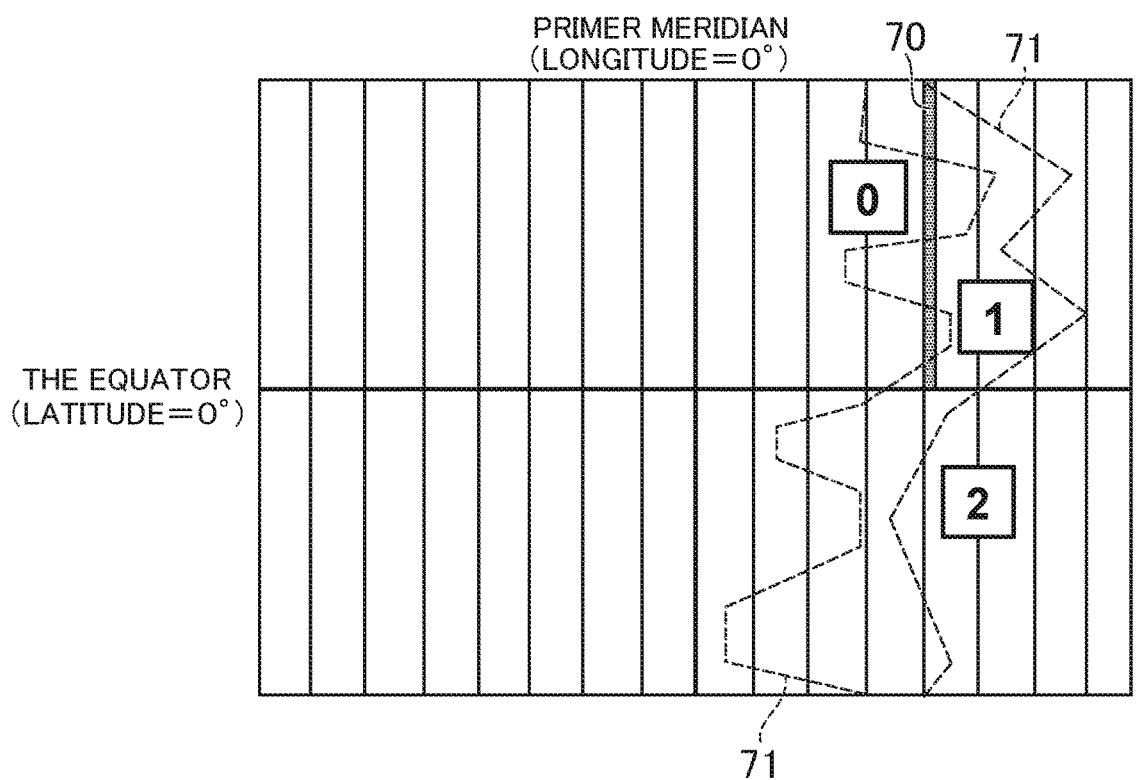
FIG. 5 is a schematic diagram showing, on a flat surface, a time zone boundary and a time difference division region employed in a satellite radio-controlled wristwatch according to the first embodiment of the present invention.

FIG. 4 schematically shows a time zone boundary 71 and a time difference division region 70 employed in the satellite radio-controlled wristwatch 1 according to the first embodiment of the present invention. FIG. 5 is a schematic diagram showing, on a flat surface, the time zone boundary 71 and the time difference division region 70 employed in the satellite radio-controlled wristwatch 1 according to the first embodiment of the present invention.

FIGS. 4 and 5 show two time zone boundaries 71 as one example. The time zone boundary 71 shown in these drawings is a line whose respective both ends are located at the North Pole (the point at latitude 90° N) and the South Pole (the point at latitude 90° S). However, the respective both ends of the time zone boundary 71 may not be located at the North and South Poles. Instead, any closed area on the ground surface may be defined as a time zone.

In the satellite radio-controlled wristwatch 1 according to this embodiment, a reference line extending along a great circle orthogonal to a specific great circle on the earth is used as a reference line for defining a time difference division region 70. Specifically, the specific great circle is the equator (the 0° latitude line), and the great circle orthogonal to the specific great circle is a line of longitude. In this embodiment, the time difference division region 70 is a region sandwiched by two lines of longitude, or two reference lines. Alternatively, the reference line may be a reference line extending along a specific great circle on the earth or a circle parallel to the great circle, as will be described later. In this case, assuming that the specific great circuit is the equator, the circle in parallel to the specific great circle is a line of latitude. In this embodiment, each of the northeastern, northwestern, southeastern, and southwestern regions is divided for every 1 minute of longitude to set time difference divisions regions 70. That is, each time difference division region 70 is a wedge-shaped region (or a band-shaped region in Mercator projection) for 1 minute of longitude between latitudes 0° and 90° N/S.

In the examples shown in FIGS. 4 and 5, the time difference division of the region sandwiched by the time zone boundaries 71 is "1". The time difference division on the west of that region is "0"; that on the east is "2". The time difference division is associated with a time zone and at least either one of summer time and a town, as will be described later. Determining a time difference division to which the satellite radio-controlled wristwatch 1 belongs enables detailed time correction.

In the examples shown in FIGS. 4 and 5, the time difference division region 70 is a region located northeast. In the satellite radio-controlled wristwatch 1 according to this embodiment, the ground surface is divided into four regions, namely, northeastern, northwestern, southeastern, and southwestern regions. This can make a simple data structure as the negative latitude need not be considered.

Figure 6:
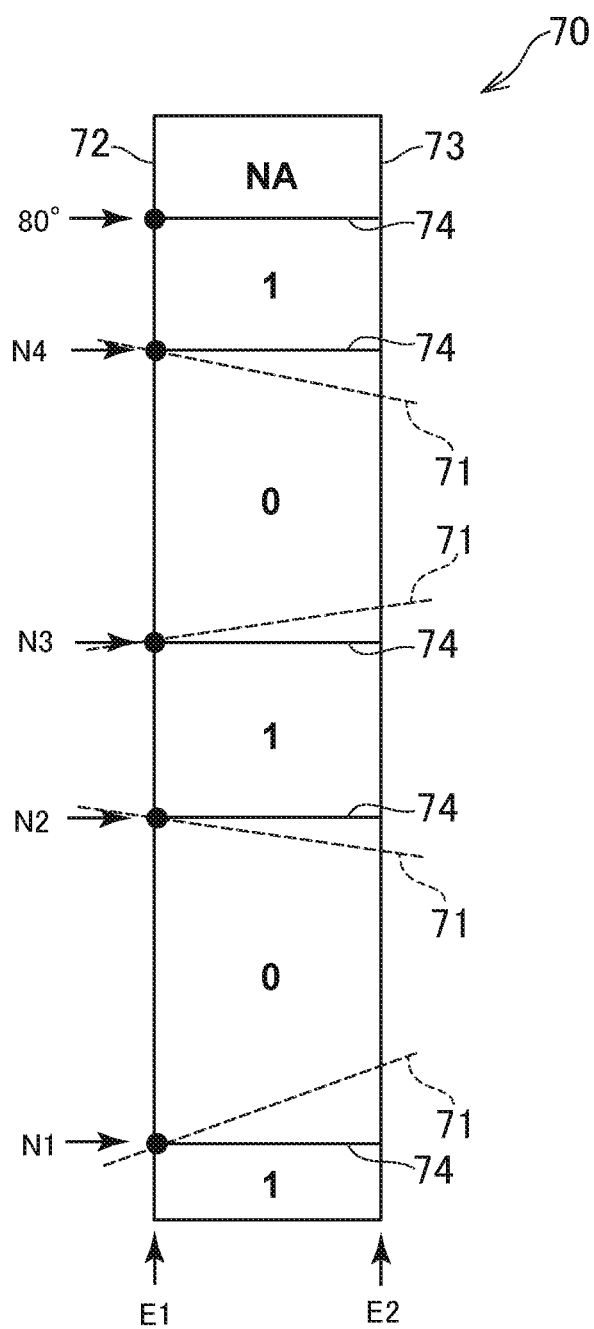
FIG. 6 shows a first example of a time difference division region employed in a satellite radio-controlled wristwatch according to the first embodiment of the present invention.

FIG. 6 shows a first example of the time difference division region 70 employed in the satellite radio-controlled wristwatch 1 according to the first embodiment of the present invention. The time difference division region 70 in this example is a region from latitude 0° to 90° N between longitudes E1 and E2. A first reference line 72 that defines the time difference division region 70 is the line of longitude E1; a second reference line 73 is the line of longitude E2. The first reference line 72 intersects the time zone boundary 71 four times. The respective intersection points will be hereinafter referred to as a first intersection point positioned at latitude N1, a second intersection point positioned at latitude N2, a third intersection point positioned at latitude N3, and a fourth intersection point positioned at latitude N4.

The time difference division employed in the satellite radio-controlled wristwatch 1 according to this embodiment is determined for every wedge-shaped or band-shaped area that is adjacent to a reference line and to which an intersection point between the reference line and the time zone boundary 71 belongs. Specifically, the area is defined by two adjacent reference lines (the first reference line 72 and the second reference line 73) and a line (a division boundary 74) orthogonal to the reference lines. Here, the division boundary 74 is a line of latitude. In this example, in the range between longitudes E1 and E2, the time difference division of the area from latitude 0° to N1 is "1"; that from latitude N1 to N2 is "0"; that from latitude N2 to N3 is "1"; that from latitude N3 to N4 is "0"; that from latitude N4 to 80° N is "1". Irrespective of the east longitude, the time difference division of the area at latitude 80° N or above is "NA" (Not Applicable), and no time difference division is set to this area. This is applied to the area at latitude 80° S or above. This is because, if a time difference division is set to the area at latitude 80° or above, or the Pole, where the longitude changes largely with respect to a relatively small movement, the time difference division to which the satellite radio-controlled wristwatch 1 belongs will change very frequently. This expectedly deteriorates practicability.

When the position indicated by the position information 33a is at a predetermined latitude or above, the high latitude processing unit 31d maintains the time zone unchanged or sets a specific time zone. In the satellite radio-controlled wristwatch 1 according to this embodiment, the high latitude processing unit 31d sets the time zone to Coordinated Universal Time (UCT) when the latitude (north or south latitude) of the current position is at 80° or above. Use of 80° latitude as a reference is one example. The high latitude processing unit 31d may set the time zone to UTC when the latitude of the current position is at 85° or above, for example. Instead of UTC+0, a different time difference may be set. Alternatively, the high latitude processing unit 31d may maintain the time zone unchanged when the position indicated by the position information 33a is at a predetermined latitude or above. In this case, the time zone in the Pole will vary, depending on the longitude from which the Pole is entered. Still alternatively, a user of the satellite radio-controlled wristwatch 1 may select whether the high latitude processing unit 31d maintains the time zone unchanged or sets a specific time zone.

When the high latitude processing unit 31d executes processing for maintaining the time zone unchanged or setting a specific time zone, the satellite radio-controlled wristwatch 1 according to this embodiment causes the second hand 52c to point out the no-setting processing character 53d to thereby indicate that processing for the time difference division "NA" has been executed. This allows a user of the satellite radio-controlled wristwatch 1 to know that processing for a time difference division not set has been executed. The satellite radio-controlled wristwatch 1 according to this embodiment can prevent frequent time correction at the Pole, and enables visual recognition of execution of exceptional processing.

The time zone determination unit 31a of the satellite radio-controlled wristwatch 1 according to this embodiment calculates the current position, based on the position information 33a contained in a satellite signal, and determines which time difference division region 70 the current position belongs to. Then, the time zone determination unit 31a compares the latitude of an intersection point between the time zone boundary 71 and the reference line that defines the time difference division region 70 determined and the latitude of the current position to determine which time difference division the current position belongs to. Further, the time zone determination unit 31a determines the time zone of the current position, based on the time difference division determined. Additionally, the time difference detail determination unit 31b determines summer time and a town in connection with the current position, based on the time difference division determined. With the time zone and summer time determined, the time difference is fully determined. This determination of a time difference requires various information items described below to be completed.

Figure 7:
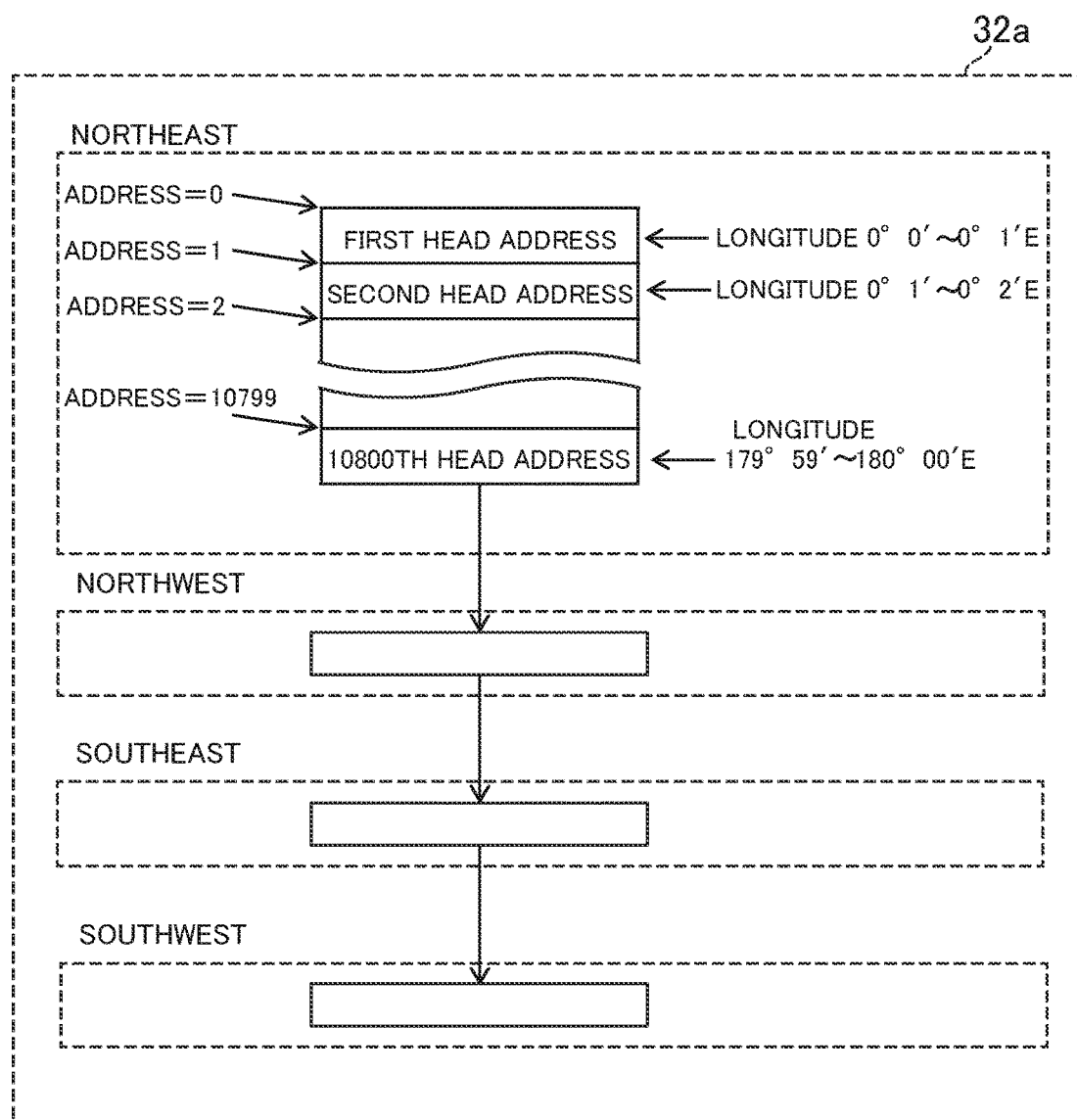
FIG. 7 shows address information stored in a satellite radio-controlled wristwatch according to the first embodiment of the present invention.

FIG. 7 shows the address information 32a stored in the ROM 32 of the satellite radio-controlled wristwatch 1 according to the first embodiment of the present invention. The address information 32a includes an address that indicates at least either one of the time difference division information and the intersection point information for every reference line (every 1 minute of longitude in this embodiment). In this embodiment, the address is a head address of the time difference division information and the intersection point information for every reference line to which the time difference division information and the intersection point information belong. The address information 32a is stored aligned in the order of the northeastern, northwestern, southeastern, and southwestern regions. Although the address information 32a for the northeastern region is shown in detail as an example in the drawing, similar information is stored for the respective northwestern, southeastern, and southwestern regions.

In this drawing, an address in a memory where the address information 32a is stored is shown for simple illustration of a data structure. Specifically, at the address=0, a first head address is stored. The first head address is the address of the time difference division and intersection point information 32b to be referred to when the current position belongs to the time difference division region between longitudes 0°0' and 0°1' E. Similarly, at the address=1, a second head address is stored. The second head address is the address of the time difference division and intersection point information 32b to be referred to when the current position belongs to the time difference division region between longitudes 0°1' and 0°2' E. In this embodiment, as each of the northeastern, northwestern, southeastern, and southwestern regions is divided for every 1 minute of longitude to thereby set time difference division regions, 180×60=10800 address information items 32a in total are available for the northeast region, for example. As this is similarly applied to the respective northwestern, southeastern, and southwestern regions, 10800×4=43200 address information items 32a are available in total. The address information items 32a for the northwestern region is stored at the addresses=10800 to 21599; those for the southeastern region at the addresses=21600 to 32399; those for southeastern region at the addresses=32400 to 43199.

The address information 32a may include overlap among a plurality of time difference division regions. When a time zone boundary extends along the line of a single latitude, the time zone boundary intersects a plurality of reference lines at the same latitude. In this case, storing the time difference division information and the intersection point information with respect to each of the plurality of time difference division regions defined by the plurality of respective reference lines will cause a waste of storage capacity. To address the above, a common head address is stored with respect to a plurality of time difference division regions having the same time difference division information and the same intersection point information so that the same time difference division information and the same intersection point information are referred to. This can avoid storing overlap of the time difference division information and the intersection point information, and thus can reduce the storage capacity required. Furthermore, while the number of time difference division information items and that of the intersection point information items are different among the respective time difference division regions, storing the time difference information and the intersection point information for the respective regions as data having the same data length may result in a waste of storage capacity because that data length should be compatible with the longest data length, and this may leave unused data area for most of the time difference division regions. Regarding this point, designating the head address of the time difference division and intersection point information 32b by using the address information 32 enables to store the time difference division information and the intersection point information for every time difference division region as variable-length data. This enables use of the storage capacity without waste.

Figure 8:
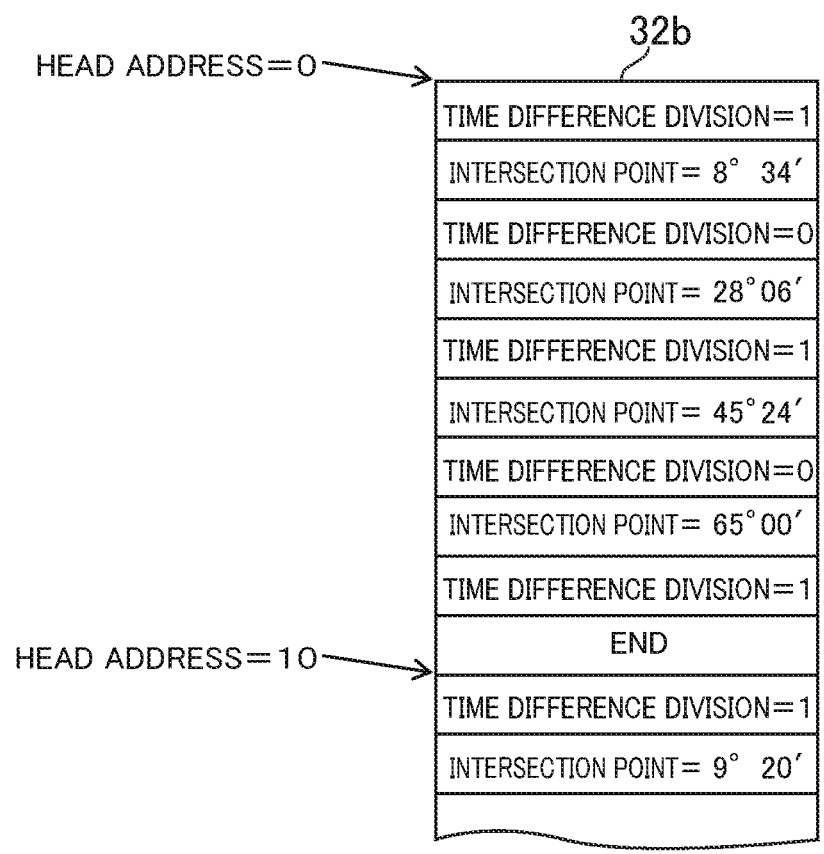
FIG. 8 shows time difference division and intersection point information stored in a satellite radio-controlled wristwatch according to the first embodiment of the present invention.

FIG. 8 shows the time difference division and intersection point information 32b stored in the satellite radio-controlled wristwatch 1 according to the first embodiment of the present invention. The intersection point information indicates the position of an intersection point between the reference line and the time zone boundary 71. Meanwhile, the time difference division information is associated with the time zone information, the summer time information, and the town information of a wedge-shaped or band-shaped area which is adjacent to the reference line and to which an intersection point between the reference line and the time zone boundary 71 belongs. The time difference division and intersection point information 32b contains the time difference division information and the intersection point information for every reference line to which the time difference division information and the intersection point information belong, so as to be referred to by using the address contained in the address information 32a.

FIG. 8 shows the time difference division information and the intersection point information of the time difference division region 70 shown in FIG. 6. The time difference division and intersection point information 32b has a data structure in which the time difference division information and the intersection point information are alternately stored. Specifically, in the memory where the time difference division and intersection point information 32b is stored, information "time difference division=1" is stored at the head address=0, and the latitude of the first intersection point, or "intersection point=8°34' (N1)", is stored at the next address. The data in this structure describes that the time difference division of the area between longitudes E1 and E2 and from latitude 0° to 8°34' (N1) N is "1". Similarly, the time difference division and intersection point information 32b describes that, in the region between longitudes E1 and E2, the time difference division of the area from latitude 8°34' (N1) to 28°6' (N2) N is "0"; that of the area from latitude 28°6' (N2) to 45°24' (N3) N is "1"; that of the area from latitude 45°24' (N3) to 65°0' (N4) N is "0". Here, the time difference division information stored at the address=8, or "time difference division information=1", and the information "END" (a reference mark indicating the end of data for the reference line to which the time difference division and intersection point information 32b belongs) stored at the address=9 describe that the time difference division of the area from latitude 65°0' (N4) to 80° N is "1", and that no intersection point between the first reference line 72 and the time zone boundary 71 exists in the area at latitude 65°0' (N4) Nor above. The information "END" stored at the address=9 may be read as "intersection point=80° " instead. Note that the information stored at the head address=10 and thereafter is the time difference division information and the intersection point information of the time difference division region on the east of the second reference line 73. As described above, the time difference division and intersection point information 32b stored in the satellite radio-controlled wristwatch 1 according to this embodiment has a data structure for one-to-one correspondence between the time difference division information and the intersection point information.

The above described structures of the address information 32a and the time difference division and intersection point information 32b are not exclusive examples. For example, the time difference division and intersection point information 32b having the above described data structure may be employed, while the address information 32a is not stored. In this case, the difference division and intersection point information 32b may be read sequentially from the address=0, and the number of occurrences of "END" data may be counted to obtain the time difference division information and the intersection point information in accordance with the longitude of the current position. Alternatively, the time difference division information and the intersection point information may be stored for every time difference division region as data having the same length, while the address information 32a is not stored. In this case, determining the time difference division region 70 to which the current position belongs and offsetting the memory address of the time difference division and intersection point information 32b from the address=0 by an amount corresponding to the longitude of the current position can provide the corresponding time difference division information and intersection point information.

FIG. 9 shows the time difference detail information 32c stored in the satellite radio-controlled wristwatch 1 according to the first embodiment of the present invention. The time difference detail information 32c contains the time zone information and at least either one of the summer time information and the town information associated with the time difference division information. In this embodiment, the time difference detail information 32c is information indicating a time zone, summer time, and a town associated with each time difference division. The time zone is expressed by offset from UCT. Specifically, the time zone of an area with the time difference division "0" coincides with UTC; that of an area with the time difference division "1" is 1 hour ahead of UTC; that of an area with the time difference division "2" is 1 hour ahead of UTC. Summer time is the time that is effective during a period around summer in a year. In an area with the time difference division "0", summer time is not set, for which "NA" (a reference mark indicating absence of designation) is stored. In an area with the time difference division "1", summer time is effective with 1 hour ahead during the period from the date ST1 to the date ED1. In an area with the time difference division "2", summer time is effective with 0.5 hour ahead during the period from the date ST2 to the date ED2. Note that although the area with the time difference division "1" and the area with the time difference section "2" belong to the same time zone, the periods of time with summer time effective and the amount of offset are different. Meanwhile, a town refers to the name of a representative town for each time difference division. With no specific name mentioned here, examples are given with the name of a town for the time difference division "0" as "A", that for the time difference division "1" as "B", and that for the time difference division "2" as "C".

Figure 10:
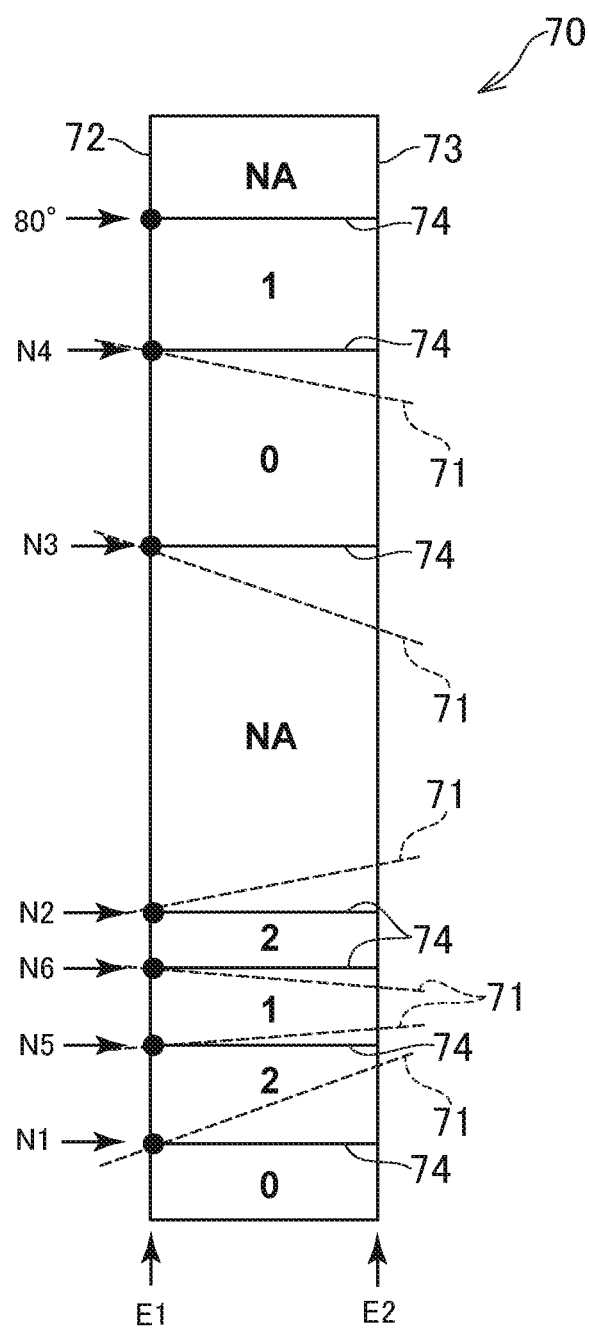
FIG. 10 shows a second example of a time difference division region employed in a satellite radio-controlled wristwatch according to the first embodiment of the present invention.

FIG. 10 shows a second example of the time difference division region 70 employed in the satellite radio-controlled wristwatch 1 according to the first embodiment of the present invention. In this example, the area between the time zone boundary 71 passing through the second intersection point at latitude N2 and that passing through the third intersection point at latitude N3 is an area for which an international agreement as to a time zone is yet to be concluded. Such an area may include an area in conflict, for example. For such an area, the time difference division of the area between the division boundary 74 passing through the second intersection point at latitude N2 and that passing through the third intersection point at latitude N3 is defined as "NA" (a reference mark indicating absence of setting) in the satellite radio-controlled wristwatch 1 according to this embodiment. For the time difference division "NA", the time difference detail information 32c indicates a time zone not set as an associated time zone. When the time zone associated with the time difference division information is "time zone not set", the time zone determination unit 31a decides to maintain the time zone unchanged or to set a specific time zone. In the satellite radio-controlled wristwatch 1 according to this embodiment, the time zone determination unit 31a maintains the time zone unchanged in the case of "time zone not set". In the example shown in FIG. 10, assume that the satellite radio-controlled wristwatch 1 moves up to the north from latitude 0° N in the region between longitudes E1 and E2. In this case, as the satellite radio-controlled wristwatch 1 initially belongs to an area with the time difference division "0", the associated time zone is UTC+0 according to the time difference detail information 32c shown in FIG. 9. Thereafter, across latitude N1 is a zone with the time difference division "2" and the time zone UTC+1, where summer time with +0.5 hour ahead is effective during the period from the date ST2 to the date E2. Further, across latitude N5 is a zone with the time difference division "1" and the time zone UTC+1, where summer time with +1 hour ahead is effective during the period from the date ST1 to the date ED1. After further movement up to the north across latitude N6 is a zone with the time difference division "2" and the time zone UTC+1, where summer time with +0.5 hour ahead is effective during the period from the data ST2 to ED2. Thereafter, across latitude N2 is a zone with the time difference division "NA" and the time zone UTC+1, where summer time with +0.5 hour ahead is effective during the period from the date ST2 to the date ED2. Further, across latitude N3 is a zone with the time difference division "0" and the time zone UTC+0. Meanwhile, assume that the satellite radio-controlled wristwatch 1 moves down to the south from latitude 80° N in the region between longitudes E1 and E2. In this case, as the satellite radio-controlled wristwatch 1 initially belongs to an area with the time difference division "1" and the associated time zone UTC+1, where summer time with +1 hour ahead is effective during the period from the date ST1 to the date ED1. Thereafter, across latitude N4 is a zone with the time difference division "0" and the time zone UTC+0. Further, across latitude N3 is a zone with the time difference division "NA" and the time zone maintained as UTC+0. Further, across latitude N2 is a zone with the time difference division "2" with the time zone UTC+1, where summer time with +0.5 hour ahead is effective during the period from the date ST2 to the date ED2. Further, across latitude N6 is a zone with the time difference division "1" and the time zone UTC+1, where summer time with +1 hour ahead is effective during the period from the date ST1 to the date ED1. As described above, a time zone employed in the satellite radio-controlled wristwatch 1 will vary, depending on the direction from which the area with a time zone not set thereto is entered. Accordingly, the time correction unit 31e corrects time differently. As described above, the satellite radio-controlled wristwatch 1 according to this embodiment can indicate time even in an area with a time zone not set thereto.

When the time zone determination unit 31a executes processing for a time zone not set, the satellite radio-controlled wristwatch 1 according to this embodiment cases the second hand 52c to point out the no-setting processing character 53d to thereby indicate that processing for the time zone division "NA" has been executed. This allows a user of the satellite radio-controlled wristwatch 1 to know that processing for a time difference division not set has been executed. Although the time zone determination unit 31a maintains the time zone unchanged in the case of the time difference division "NA" in this embodiment, the time zone determination unit 31a may set a specific time zone, for example, UTC+0.

Figure 11:
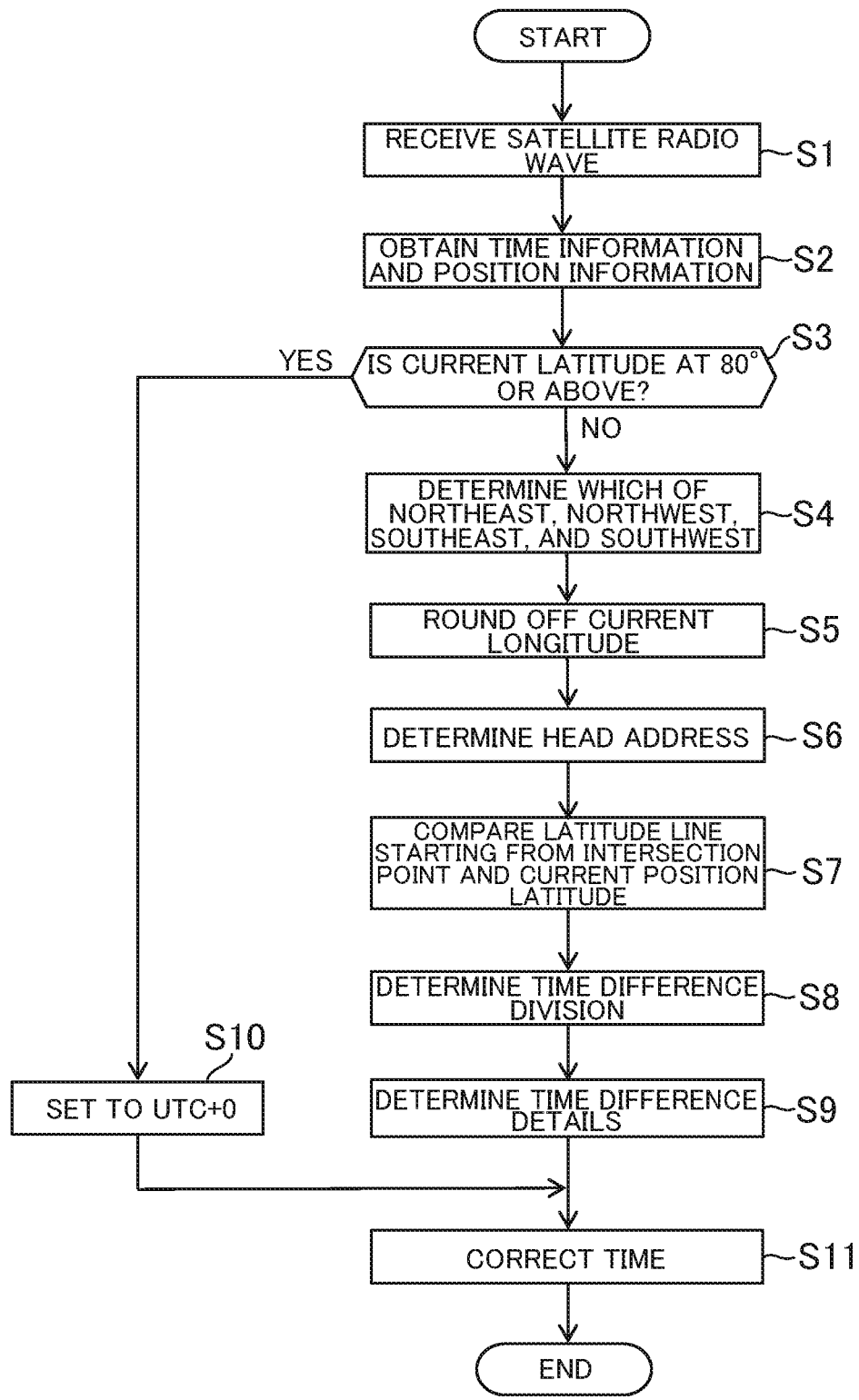
FIG. 11 is a flowchart of time correction processing executed in a satellite radio-controlled wristwatch according to the first embodiment of the present invention.

FIG. 11 is a flowchart of time correction processing executed by the satellite radio-controlled wristwatch 1 according to the first embodiment of the present invention. Having received a user operation of the operational unit 60, the satellite radio-controlled wristwatch 1 according to this embodiment begins time correction processing to initially receive a satellite radio wave (S1). The satellite radio-controlled wristwatch 1 then obtains the time information and the position information contained in a satellite signal, and stores in the RAM 33 (S2).

Then, the time zone determination unit 31a determines whether or not the latitude of the current position indicated by the position information obtained is at 80° or above (S3). When the latitude of the current position is not at 80° or above, which of the northeastern, northwestern, southeastern, and southwestern regions the current position belongs to is determined (S4). Then, the seconds or less of the longitude of the current position are rounded to the nearest minute (S5), and which time difference division region the current position belongs to is determined. For example, when the value obtained by rounding the seconds or less of the east longitude of the current position to the nearest minute is E1, it is determined that the current position belongs to the time difference division region 70 shown in FIG. 6. Meanwhile, when the value obtained by rounding the seconds or less of the east longitude of the current position to the nearest minute is E2, it is determined that the current position belongs to the time difference division region on the east of the second reference line 73.

Once the time difference division region to which the current position belongs is determined, a corresponding head address is determined (S6). With the head address determined, the address of the time difference division and intersection point information 32b to be referred to is known. Then, based on the intersection point information, the line of latitude starting from the intersection point is compared with the latitude of the current position (S7) to determine the latitudes of which intersection points the latitude of the current position is located between, to thereby determine the time difference division of the current position (S8). Subsequently, a time zone corresponding to the time difference division determined is determined with reference to the time difference detail information 32c. Additionally, the time difference detail determination unit 31b determines details on the time difference, such as summer time and a town (S9).

Meanwhile, when the latitude of the current position is at 80° or above, the high latitude processing unit 31d sets the time zone of the current position to UTC+0 (S10). As described above, the high latitude processing unit 31d may maintain the time zone of the current position to thereby take over the time zone so far, as described above.

Once details on the time difference of the current position of the satellite radio-controlled wristwatch 1 are determined, the time correction unit 31e corrects time, based on the time difference information (S11). This ends the time correction processing by the satellite radio-controlled wristwatch 1.

Figure 12:
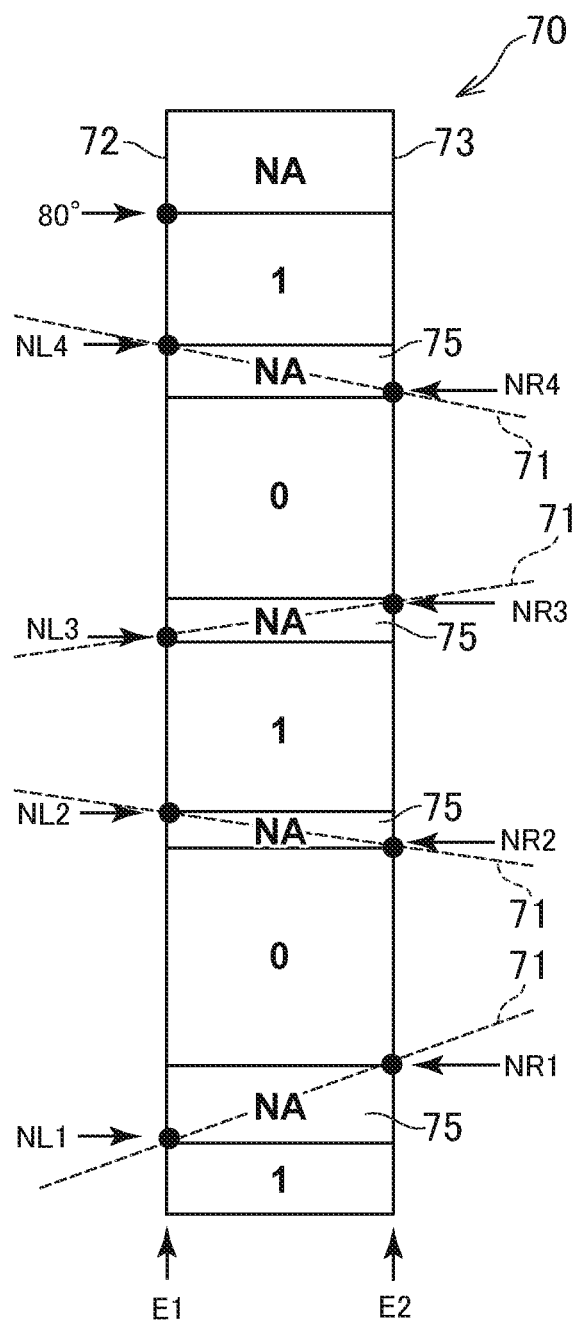
FIG. 12 shows an exceptional processing range set in a satellite radio-controlled wristwatch according to a first modified example of the first embodiment of the present invention.

FIG. 12 shows an exceptional processing range 75 set in the satellite radio-controlled wristwatch 1 according to a first modified example of the first embodiment of the present invention. Although the time difference division region 70 shown in FIG. 12 is the same as the time difference division region shown in FIG. 6, in the satellite radio-controlled wristwatch 1 according to this modified example, the exceptional processing range setting unit 31c sets an exceptional processing range 75 near the time zone boundary.

In the time difference division region 70 shown in FIG. 12, intersection points between the first reference line 72 and the time zone boundary 71 are defined at respective latitudes NL1, NL2, NL3, and NL4 sequentially from the south. Additionally, intersection points between the second reference line 73 and the time zone boundary 71 are defined at respective latitudes NR1, NR2, NR3, and NR4 sequentially from the south. One of the intersection points between the first reference line 72 and the time zone boundary 71, positioned at latitude NL1 will be hereinafter referred to as a first intersection point, and one of the intersection points between the second reference line 73 and the time zone boundary 71, positioned at latitude NR1 will be hereinafter referred to as a second intersection point. The exceptional processing range 75 is a range defined by two adjacent reference lines (the first reference line 72 and the second reference line 73), a line passing through the first intersection point and orthogonal to the reference lines (the latitude NL1 line), and a line passing through the second intersection point and orthogonal to the reference lines (the line of latitude NR1). In the example shown in FIG. 12, there are four exceptional processing ranges 75 having different widths in the latitude direction. The respective widths in the latitude direction of the exceptional processing ranges 75 become wider or narrower, depending on the angle of inclination of the time zone boundary 71.

In this modified example, after determination of the time difference division region 70 to which the current position belongs and before determination of the time difference division of the current position, the exceptional processing range setting unit 31c reads in the intersection points belonging to the time difference division region 70, and sets an exceptional processing range 75. When the position indicated by the position information 33a is inside the exceptional processing range 75, the time zone determination unit 31a maintains the time zone unchanged. For example, assume that the satellite radio-controlled wristwatch 1 moves up to the north from the point at latitude 0° N in the region between longitudes E1 and E2. In this case, the satellite radio-controlled wristwatch 1 initially belongs to an area with the time difference division "1". Thereafter, after movement to the north beyond latitude NL1, the time zone remains unchanged to maintain the time zone for the time difference division "1". After further movement to the north beyond latitude NR1, the time difference division is changed to "0", and the time zone is also changed. Then, assume that the satellite radio-controlled wristwatch 1 turns around to move down to the south. After movement across latitude NR1, the time zone remains unchanged, and the time zone corresponding to the time difference division "0" is maintained. After further movement to the south beyond latitude NL1, the time difference division is changed to "1", and the time zone is also changed. As described above, according to the satellite radio-controlled wristwatch 1 according to this modified example, the time zone remains unchanged near the time zone boundary so that the time zone so far is maintained.

Figure 13:
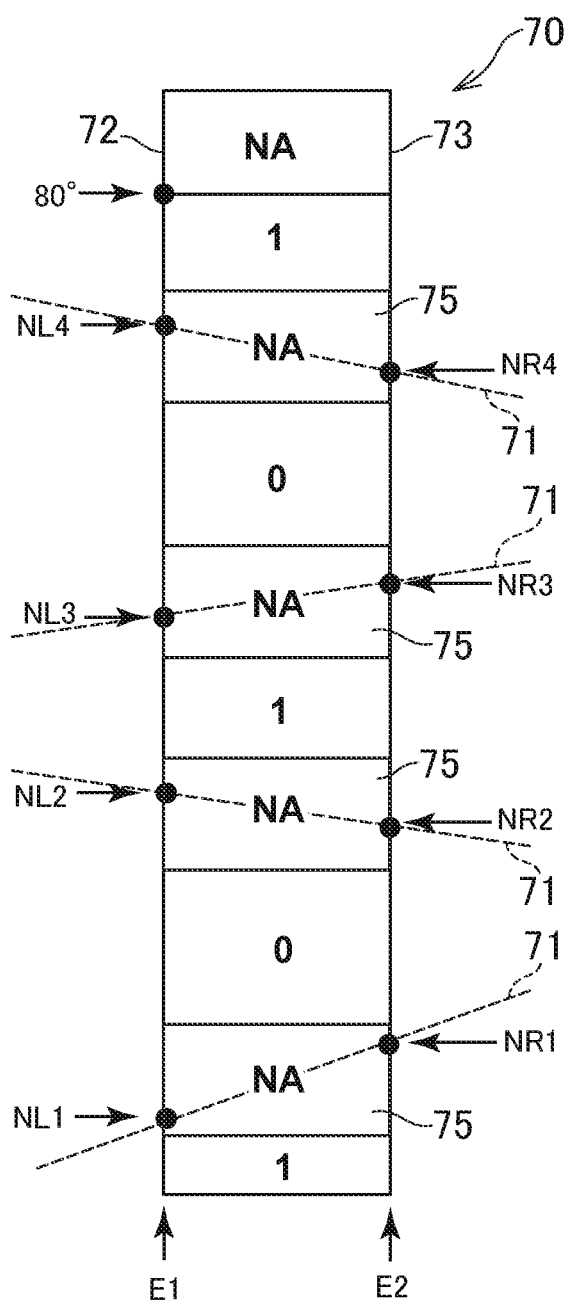
FIG. 13 shows an exceptional processing range set in a satellite radio-controlled wristwatch according to a second modified example of the first embodiment of the present invention.

FIG. 13 shows the exceptional processing range 75 set in the satellite radio-controlled wristwatch 1 according to a second modified example of the first embodiment of the present invention. Although the time difference division region 70 shown in FIG. 13 is the same as the time difference division region shown in FIG. 6, in the satellite radio-controlled wristwatch 1 according to this modified example, the exceptional processing range setting unit 31c sets exceptional processing ranges 75 having the same width in the latitude direction near the time zone boundary 71.

The exceptional processing range 75 shown in FIG. 13 is a range containing an intersection point between the reference line and the time zone boundary 71 and defined by two adjacent reference lines and two lines (lines of latitude) apart from each other by a predetermined distance and orthogonal to the two reference lines. Specifically, an exceptional processing range 75 that contains the intersection point positioned at latitude NL1 and the intersection point positioned at latitude NR1 is defined by the first reference line 72, the second reference line 73, and two lines of latitude apart from each other in the latitude direction by a predetermined distance. In the example shown in FIG. 13, four exceptional processing ranges 75 having the same width in the latitude direction are shown. As the width of the exceptional processing range 75 in the latitude direction is determined in advance as described above, the exceptional processing range 75 can be set independently of the angle of inclination of the time zone boundary. This reduces a computing load.

In the satellite radio-controlled wristwatch 1 according to this modified example as well, after determination of the time difference division region 70 to which the current position belongs and before determination of the time difference division of the current position, the exceptional processing range setting unit 31c reads in the intersection points belonging to the time difference division region 70, and sets an exceptional processing range 75. When the position indicated by the position information 33a is inside the exceptional processing range 75, the time zone determination unit 31a maintains the time zone unchanged. As described above, according to the satellite radio-controlled wristwatch 1 according to this modified example, the time difference remains unchanged in a predetermined range containing a time zone boundary so that the time difference so far is maintained.

With the exceptional processing for time correction executed, the satellite radio-controlled wristwatch 1 according to the first and second modified examples of this embodiment causes the second hand 52c to point out the no-setting processing character 53d to thereby indicate that processing for the time difference division "NA" has been executed. This allows a user of the satellite radio-controlled wristwatch 1 to know that processing for a time difference division not set has been executed.

Figure 14:
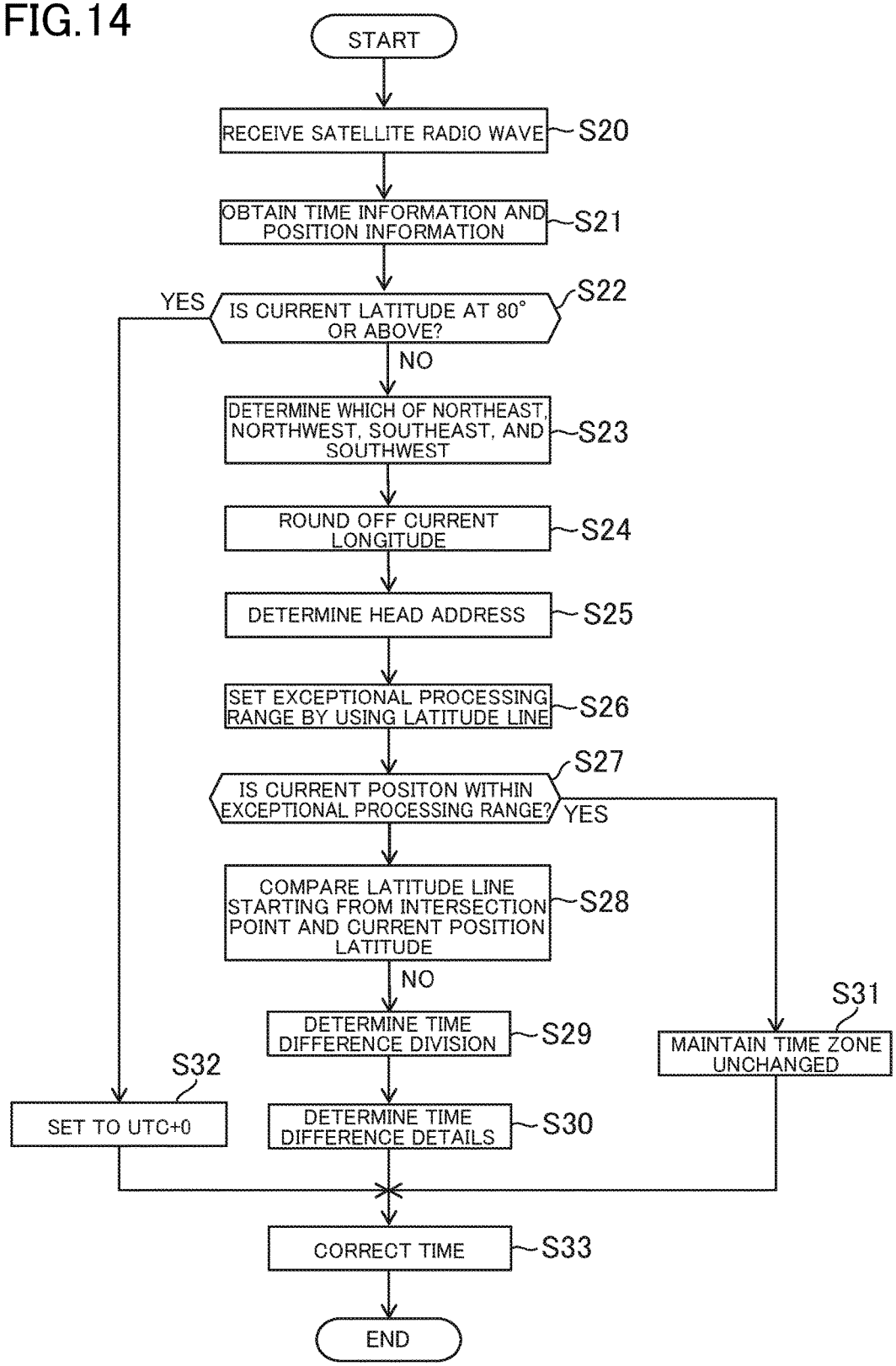
FIG. 14 is a flowchart of exceptional processing for time correction executed by a satellite radio-controlled wristwatch according to the first and second modified examples of the first embodiment of the present invention.

FIG. 14 is a flowchart of exceptional processing for time correction executed in the satellite radio-controlled wristwatch 1 according to the first and second modified examples of the first embodiment of the present invention. Having received a user operation of the operational unit 60, the satellite radio-controlled wristwatch 1 according to the first and second modified examples begins time correction processing to initially receive a satellite radio wave (S20). The satellite radio-controlled wristwatch 1 then obtains the time information and the position information contained in a satellite signal, and stores in the RAM 33 (S21).

Then, the time zone determination unit 31a determines whether or not the latitude of the current position indicated by the obtained position information is at 80° or above (S22). When the latitude of the current position is not at 80° or above, which of the northeastern, northwestern, southeastern, and southwestern regions the current position belongs to is determined (S23). Then, the seconds or less of the longitude of the current position are rounded to the nearest minute (S24), and which time difference division region the current position belongs to is determined.

Once the time difference division region to which the current position belongs is determined, a corresponding head address is determined (S25). Thereafter, the exceptional processing range setting unit 31c reads in the intersection point information, and sets an exceptional processing range 75, by using lines of latitude (S26). Then, according to the satellite radio-controlled wristwatch 1 according to the first modified example, the exceptional processing range setting unit 31c sets an exceptional processing range 75, by using a line of latitude passing through an intersection point between the reference line and the time zone boundary. Meanwhile, according to the satellite radio-controlled wristwatch 1 according to the second modified example, the exceptional processing range setting unit 31c sets an exceptional processing range 75, by using lines of latitude apart from each other by a predetermined distance.

Thereafter, whether or not the position indicated by the position information 33a is located inside the exceptional processing range 75 is determined (S27). When the current position is not inside the exceptional processing range, with reference to the time difference division and intersection point information 32b at the head address determined, the line of latitude starting from the intersection point is compared with the latitude of the current position, based on the intersection point information (S28), to thereby determine the latitudes of which intersection points the latitude of the current position is located between to thereby determine the time difference division of the current position (S29). Subsequently, a time zone corresponding to the time difference division determined is determined, with reference to the difference detail information 32c. Additionally, the time difference detail determination unit 31b determines details on the time difference, such as summer time and a town (S30).

Meanwhile, when the current position is inside the exceptional processing range, the time zone determination unit 31a decides to maintain the time zone unchanged (S31). When the latitude of the current position is at 80° or above, the high latitude processing unit 31d sets the time zone of the current position to UTC+0 (S32). As described above, the high latitude processing unit 31d may maintain the time zone of the current position to thereby take over the time zone so far, as described above.

Thereafter, the time correction unit 31e corrects time, based on the information on the time difference determined (S33). This ends the exceptional processing for time correction by the satellite radio-controlled wristwatch 1 according to the first and second modified examples.

[Second Embodiment]

Figure 15:
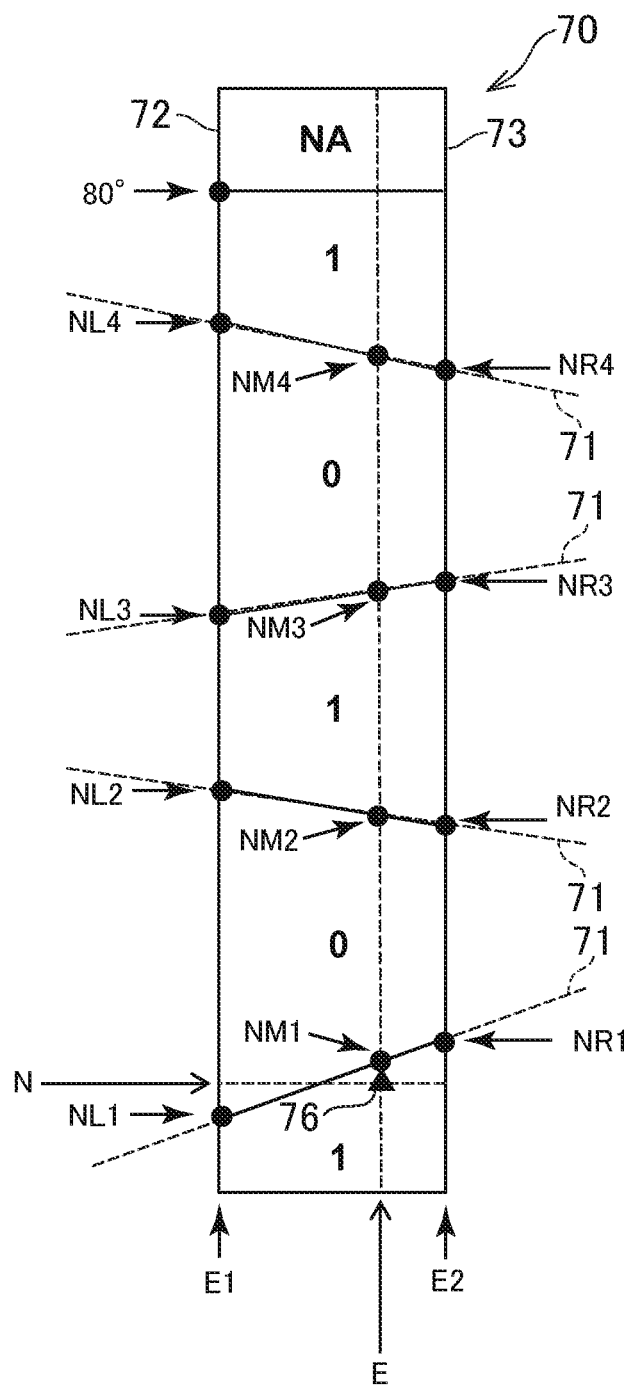
FIG. 15 shows a first example of a time difference division region employed in a satellite radio-controlled wristwatch according to a second embodiment of the present invention.

FIG. 15 shows a first example of the time difference division region 70 employed in the satellite radio-controlled wristwatch 1 according to a second embodiment of the present invention. The satellite radio-controlled wristwatch 1 according to the second embodiment differs from the satellite radio-controlled wristwatch 1 according to the first embodiment in the content of the time difference division and intersection point information 32b stored and in a method for determining a time difference division. Other structures of the satellite radio-controlled wristwatch 1 according to the second embodiment correspond to those of the satellite radio-controlled wristwatch 1 according to the first embodiment. The below describes a difference in structure of the satellite radio-controlled wristwatch 1 according to the second embodiment from the satellite radio-controlled wristwatch 1 according to the first embodiment.

The time difference division region 70 shown in FIG. 15 is a region from latitude 0° to 90° N between longitudes E1 and E2. In the example shown in this drawing, the first reference line 72 intersects the time zone boundary 71 at respective latitudes NL1, NL2, NL3, and NL4. Meanwhile, the second reference line 73 intersects the time zone boundary 71 at respective latitudes NR1, NR2, NR3, and NR4. With respect to the intersection point positioned at latitude NL1, the intersection point positioned at latitude NR1 is referred to as an adjacent intersection point. In this embodiment, adjacent intersection point information that makes a pair with the intersection point information is stored as a part of the time difference division and intersection point information 32b in the ROM 32. With respect to the intersection point positioned at latitude NL2, the intersection point positioned at latitude NR2 is the adjacent intersection point. With respect to the intersection point positioned at latitude NL3, the intersection point positioned at latitude NR3 is the adjacent intersection point. Similarly, with respect to the intersection point positioned at latitude NL4, the intersection point positioned at latitude NR4 is the adjacent intersection point. With a part of the time zone boundary 71 contained in one time difference division region 70 focused, an intersection point and an adjacent intersection point are points positioned at respective both ends of this segment.

FIG. 15 shows a triangle that represents the current position 76 of the satellite radio-controlled wristwatch 1 indicated by the position information 33a. The current position is located at latitude N and longitude E. Latitude N is located between latitudes NL1 and NR1.

The time difference division employed in the satellite radio-controlled wristwatch 1 according to this embodiment is determined for every wedge-shaped or belt-shaped area that is adjacent to a reference line and to which an intersection point between the reference line and the time zone boundary belongs. Specifically, such an area is defined by the first reference line 72, the second reference line 73, and a line connecting the first intersection point and the second intersection point (the adjacent intersection point of the first intersection point). One example of an area with a time difference division set thereto is a quadrilateral area connecting the point at latitude 0° N and longitude E1, the point at latitude NL1 and longitude E1, the point at latitude NR1 and longitude E2, and the point at latitude 0° N and longitude E2. The time difference division of this area is "1".

In the example shown in FIG. 15, the time difference division of the current position 76, located in the above mentioned area, is "1". Assume here that the satellite radio-controlled wristwatch 1 according to the first embodiment of the present invention is located at the same position. In this case, the time difference division of the current position 76 will be determined as "0" as the latitude of the current position 76 is above latitude NL and equal to or below latitude NL2. However, an error due to inclination of the time zone boundary 71 relative to a line of latitude will be sufficiently small also in the case of the satellite radio-controlled wristwatch 1 according to the first embodiment when the width of the time difference division region 70 in the longitude direction is sufficiently small (for example, a width for 1 minute of longitude).

According to the satellite radio-controlled wristwatch 1 according to this embodiment, the boundary of an area with a time difference division set thereto can be defined so as to coincide with the time zone boundary 71 if the time zone boundary 71 is a straight line. Thus, the respective widths in the longitude direction of the time difference division regions 70, which are the same (specifically, for every 1 minute) in the first embodiment, may vary depending on a position in this embodiment. For example, a reference line may be drawn at a longitude at which the time zone boundary 71 bends or the time zone boundaries 71 join so as to linearly interpolate between the intersection points each between the reference line and the time zone boundary 71. Employment of this structure can remarkably reduce the storage capacity for storing information for determining a time zone, based on the position information, while keeping high accuracy in determination of a time difference division.

Specifically, the time difference division is determined as follows in the satellite radio-controlled wristwatch 1 according to this embodiment. Initially, the ratio between the distance along the line of latitude from the first reference line 72 to the current position 76 and that along the line of latitude from the first reference line 72 to the second reference line 73 is obtained as $Z=(E-E1)/(E2-E1)$. Based on the ratio obtained, the latitude NM1 of the intersection point between the linear interpolation line connecting the point at latitude NL1 and longitude E1 and the point at latitude NR1 and longitude E2 and the line of longitude passing through the current position 76 is obtained as $NM1=NL1+(NR1-NL1) \times Z$. Similarly, latitudes NM2, NM3, and NM4 of the respective intersection points between the line of longitude passing through the current position 76 and the respective linear interpolation lines are obtained, based on the ratio obtained. Then, which of the latitudes NM1, NM2, NM3, and NM4 the latitude N of the current position 76 is located between is determined to determine the time difference division to which the current position 76 belongs. Note that in the case where the north latitude, or N, of the current position coincides with latitude NM1, for example, the current position may be determined as belonging to the time difference division on the south of latitude NM1. Instead, the current position may be determined as belonging to the time difference division on the north of latitude NM1.

Below, an example citing specific numbers will be given. Assume a case of E1=10°00', E2=10°01', and the east longitude of the current position 76 being 9°00', or E=9°00', for example. In this case, NM1=9°08'30", NM2=27°55'30", NM3=45°49'30", and NM4=64°04'30" are obtained. Based on these, it is determined that the north latitude of the current position 76, or N=9°00', is equal to 0° or above and below NM1. Accordingly, it is determined that the time difference division of the current position 76 is "1".

Figure 16:
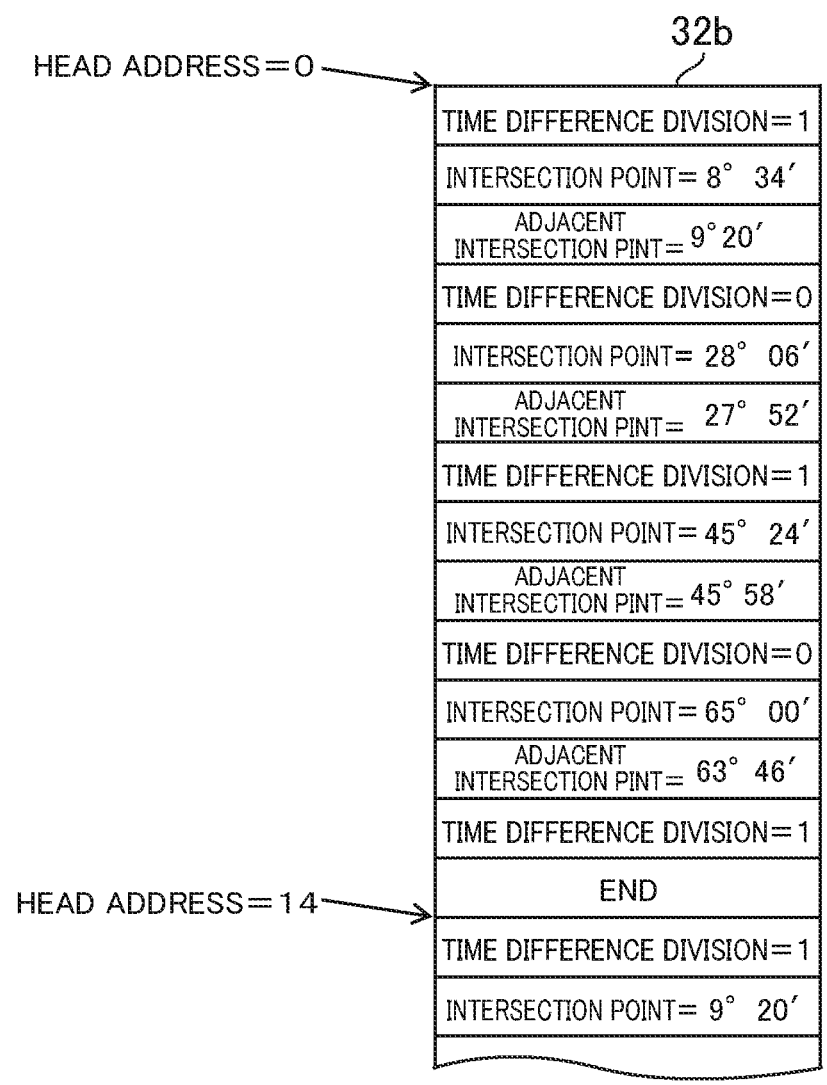
FIG. 16 shows time difference division and intersection point information stored in a satellite radio-controlled wristwatch according to the second embodiment of the present invention.

FIG. 16 shows the time difference division and intersection point information 32b stored in the satellite radio-controlled wristwatch 1 according to the second embodiment of the present invention. In the ROM 32 of the satellite radio-controlled wristwatch 1 according to this embodiment, second intersection point information (adjacent intersection point information) is stored so as to be associated with first intersection point information. The first intersection point information indicates the position of a first intersection point between the first reference line 72 and the time zone boundary 71, while the second intersection point information indicates the position of a second intersection point (an adjacent intersection point of the first intersection point) that is an intersection point between the second reference line 73 adjacent to the first reference line 72 and the time zone boundary 71. The time difference division and intersection point information 32b has a data structure in which the time difference division information, the intersection point information, and the adjacent intersection point information are repetitively stored. Specifically, at the head address=0 in the memory where the time difference division and intersection point information 32b is stored, information "time difference division=1" is stored. At the next address, the latitude of the first intersection point, or "intersection point=8°34' (NL1)", is stored. At the further next address, the latitude of the second intersection point (the latitude of the adjacent intersection point of the first intersection point), or "adjacent intersection point=9°20' (NR1)", is stored. The data having this structure describes that the time difference division of a quadrilateral area defined by the line connecting the point at latitude 0° N and longitude E1, the point at latitude 8°34' N and longitude E1, the point at latitude 9°20' N and longitude E2, and the point at latitude 0° N and longitude E2 is "1". At the address=3, information "time difference division=0" is stored. Thereafter, information "intersection point=28°06' (NL2)", and "adjacent intersection point=27°52' (NR2)" are stored. This describes that the time difference division of a quadrilateral area defined by the line connecting the point at latitude 8°34' N and longitude E1, the point at latitude 28°06'

N and longitude E1, the point at latitude 27°52' N and longitude E2, and the point at latitude 9°20' N and longitude E2 is "0". Note that the information stored at the head address=14 and thereafter is the time difference division information and the intersection point information of the time difference division region on the east of the second reference line 73. As described above, the satellite radio-controlled wristwatch 1 according to this embodiment can designate an area with a time difference division set thereto more faithfully to the time zone boundary 71.

Note that as the value stored as the adjacent intersection point information is a value of the intersection point information in connection with the adjacent reference line, the time difference division and intersection point information 32b may contain the number of an intersection point between the second reference line 73 and the time zone boundary 71 so as to be associated with the latitude of a corresponding intersection point between the first reference line 72 and the time zone boundary 71. The number of an intersection point is a number indicating the order in which the intersection point information is stored in the memory. In this embodiment, as information items on the intersection points belonging to the northern hemisphere are stored sequentially from the south to the north (from the north to the south as to the southern hemisphere), the number of each intersection point is the number of the intersection point when counted from latitude 0° N to latitude 90° N for every reference line. For example, in the example shown in FIG. 15, there are four intersection points between the time zone boundary 71 and the second reference line 73 adjacent to the first reference line 72, namely, sequentially from the south, a first intersection point (an intersection point at latitude NR1), a second intersection point (an intersection point at latitude NR2), a third intersection point (an intersection point at latitude NR3), and a fourth intersection point (an intersection point at latitude NR4). The time difference division and intersection point information 32b may contain "1" as the number of the adjacent intersection point so as to be associated with the latitude of the intersection point at latitude NL1, or the intersection point between the first reference line 72 and the time zone boundary 71, "2" as the number of the adjacent intersection point so as to be associated with the latitude of the intersection point at latitude NL2, "3" as the number of the adjacent intersection point so as to be associated with the latitude of the intersection point at latitude NL3, and "4" as the number of the adjacent intersection point so as to be associated with the latitude of the intersection point at latitude NL4. Once the number of the adjacent intersection point of an intersection point is known, the latitude of the adjacent intersection point can be read to calculate a linear interpolation line. Then, comparison with the latitude of the current position can determine the time difference division of the current position. Employment of this data structure enables further reduction of the storage capacity for storing information for determining a time zone, based on the position information, and accurate determination of a time zone.

Figure 17:
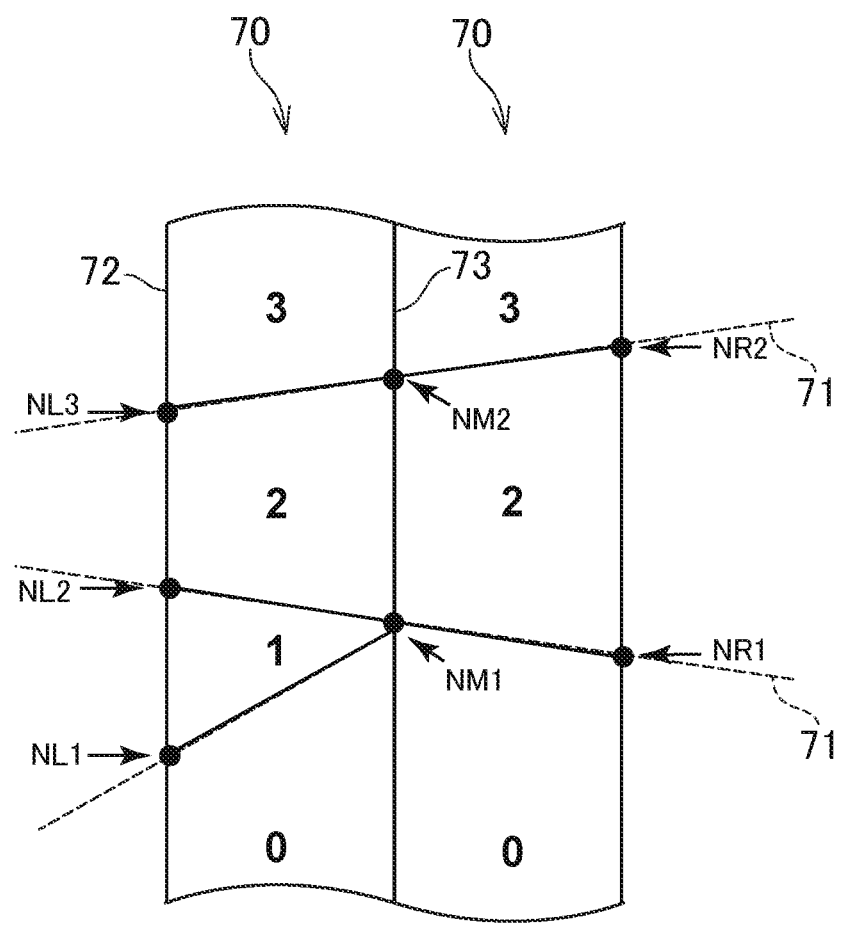
FIG. 17 shows a second example of a time difference division region employed in a satellite radio-controlled wristwatch according to the second embodiment of the present invention.

FIG. 17 shows a second example of the time difference division region 70 employed in the satellite radio-controlled wristwatch 1 according to the second embodiment of the present invention. In this drawing, two adjacent time difference division regions 70 are shown, with a part of the time zone boundary 71 branching at latitude NM1.

The satellite radio-controlled wristwatch 1 according to this embodiment can define a unique area with a time difference division set thereto even when the time zone boundary 71 branches. In this embodiment, the adjacent intersection point information that makes a pair with the intersection point information is available as the time difference division and intersection point information 32b. Thus, drawing a linear interpolation line connecting an intersection point and an adjacent intersection point enables determination of a unique area with a time difference division set thereto.

Specifically, in the example shown in FIG. 17, among the intersection points between the first reference line 72 and the time zone boundary 71, the adjacent intersection point of the intersection point positioned at latitude NL1 is the intersection point positioned at latitude NM1; the adjacent intersection point of the intersection point positioned at latitude NL2 is the intersection point positioned at latitude NM1; the adjacent intersection point of the intersection point positioned at latitude NL3 is the intersection point positioned at latitude NM2 This information is written in a memory area beginning with the head address corresponding to the time difference division region 70 shown on the left side in FIG. 17 in the memory area for the time difference division and intersection point information 32b. Meanwhile, among the intersection points between the second reference line 73 and the time zone boundary 71, the adjacent intersection point of the intersection point positioned at latitude NM1 is the intersection point positioned at latitude NR1; the adjacent intersection point of the intersection point positioned at latitude NM2 is the intersection point positioned at latitude NR2. Although the time zone boundary 71 branches at the intersection point positioned at latitude NM1, storing an intersection point and an adjacent intersection point together enables to draw a unique linear interpolation line that connects the intersection point and the adjacent intersection point. This enables designation of a unique area with a time difference division set thereto.

Figure 18:
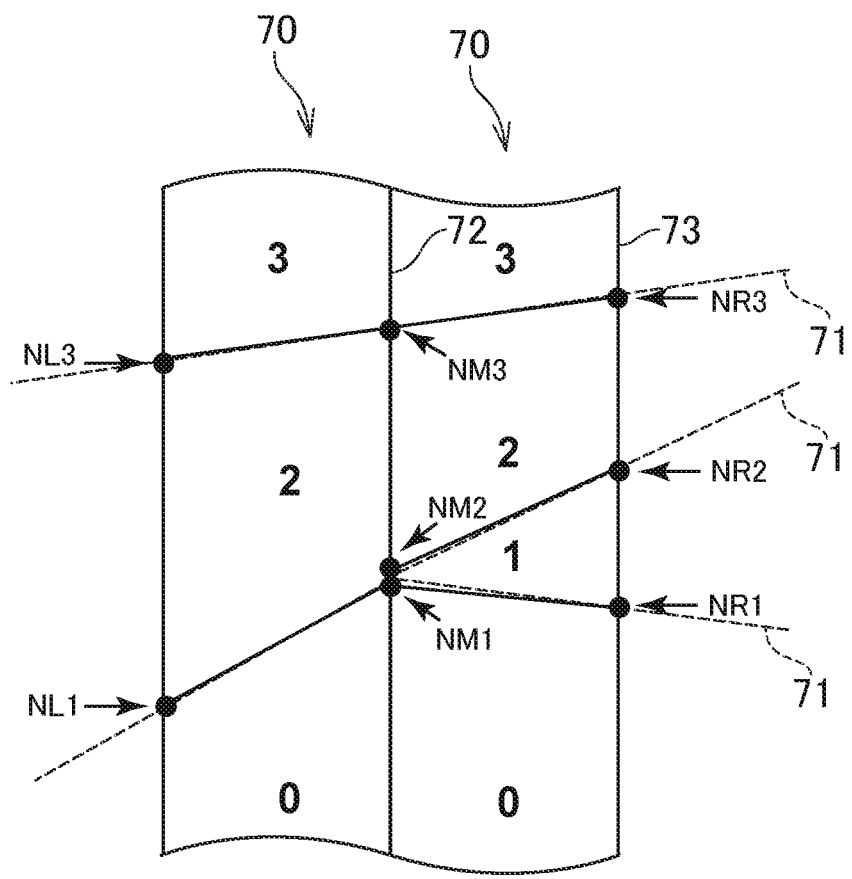
FIG. 18 shows a third example of a time difference division region employed in a satellite radio-controlled wristwatch according to the second embodiment of the present invention.

FIG. 18 shows a third example of the time difference division region 70 employed in the satellite radio-controlled wristwatch 1 according to the second embodiment of the present invention. In this example, the time zone boundary 71 branches from the west to the east (from left to right in FIG. 18). In this embodiment, two intersection point information items are assigned to an intersection point that is a branch point in order to draw a unique linear interpolation line in this case as well.

Specifically, in the example shown in FIG. 18, among the intersection points between the first reference line 72 and the time zone boundary 71, the intersection point positioned at latitude NM1 and the intersection point positioned at latitude NM2 are located at the same latitude. Although the intersection point positioned at latitude NM1 is shown displaced from the intersection point positioned at latitude NM2 in the example shown in FIG. 18 for brevity of explanation, latitude NM1 and latitude NM2 are located at the same latitude. The adjacent intersection point of the intersection point positioned at latitude NM1 is the intersection pint at latitude NR1, and the adjacent intersection point of the intersection point positioned at latitude NM2 is the intersection point positioned at latitude NR2. This information is stored in the time difference division and intersection point information 32b. By desirably increasing the number of intersection points so as to accommodate one-to-one correspondence between an intersection point and an adjacent intersection point, as described above, it is possible to draw a unique linear interpolation line that connects an intersection point and an adjacent intersection point. This can designate a unique area with a time difference division set thereto.

Figure 19:
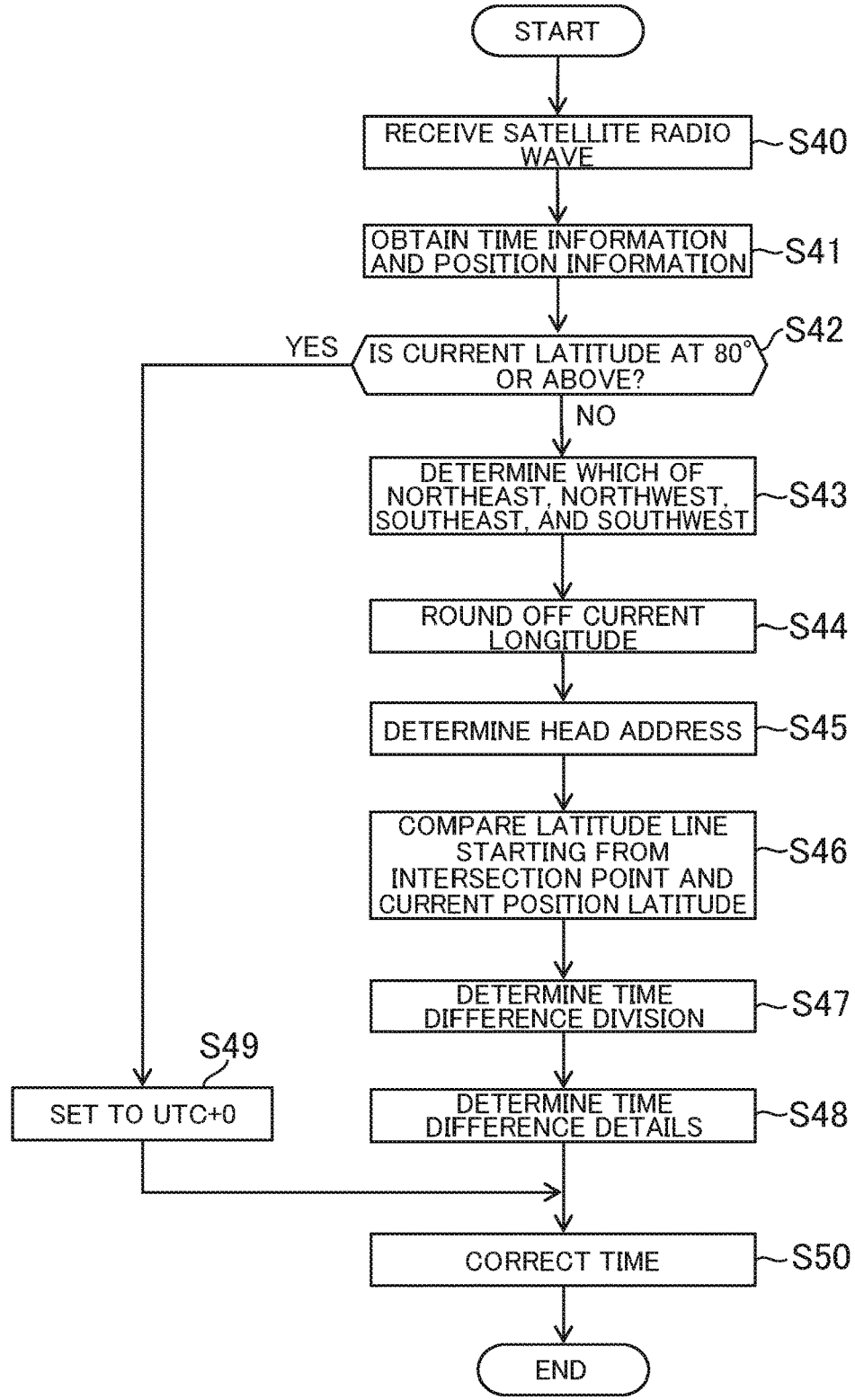
FIG. 19 is a flowchart of time correction processing executed by a satellite radio-controlled wristwatch according to the second embodiment of the present invention.

FIG. 19 is a flowchart of a time correction processing executed by the satellite radio-controlled wristwatch 1 according to the second embodiment of the present invention. Having received a user operation of the operational unit 60, the satellite radio-controlled wristwatch 1 according to the second embodiment begins time correction processing to initially receive a satellite radio wave (S40). The satellite radio-controlled wristwatch 1 then obtains the time information and the position information contained in a satellite signal and stores in the RAM 33 (S41).

Then, the time zone determination unit 31a determines whether or not the latitude of the current position indicated by the obtained position information is at 80° or above (S42). When the latitude of the current position is not at 80° or above, which of the northeastern, northwestern, southeastern, and southwestern regions the current position belongs to is determined (S63). Then, the seconds or less of the longitude of the current position are rounded to the nearest minute (S44), and which time difference division region the current position belongs to is determined.

Once the time difference division region to which the current position belongs is determined, a corresponding head address is determined (S45). With the head address determined, the address of the time difference division and intersection point information 32b to be referred to is known. Then, based on the intersection point information and the adjacent intersection point information, the linear interpolation line connecting the intersection point and the adjacent intersection point is compared with the latitude of the current position (S46) to determine which linear interpolation lines the latitude of the current position is located between to thereby determine the time difference division of the current position (S47). Subsequently, by referring to the time difference detail information 32c, a time zone corresponding to the time difference division determined is determined. Additionally, the time difference detail determination unit 31b determines details on the time difference, such as summer time and a town (S48).

Meanwhile, when the latitude of the current position is at 80° or above, the high latitude processing unit 31d sets the time zone of the current position to UTC+0 (S49). As described above, the high latitude processing unit 31d may maintain the time zone of the current position to thereby take over the time zone so far, as described above.

Once details on the time difference of the current position of the satellite radio-controlled wristwatch 1 are determined, the time correction unit 31e corrects time, based on the time difference information (S50). This ends the time correction processing by the satellite radio-controlled wristwatch 1.

Figure 20:
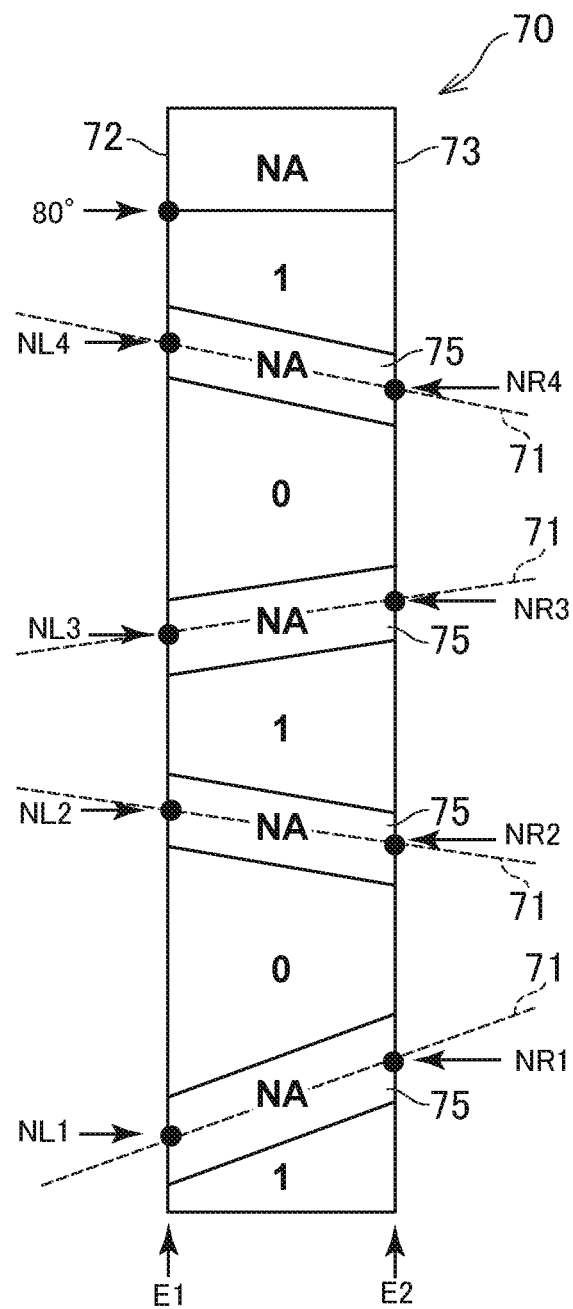
FIG. 20 shows an example of an exceptional processing range in a satellite radio-controlled wristwatch according to a modified example of the second embodiment of the present invention.

FIG. 20 shows an example of the exceptional processing range 75 according to the satellite radio-controlled wristwatch 1 according to a modified example of the second embodiment of the present invention. Although the time difference division region 70 shown in FIG. 20 is the same as the time difference division region shown in FIG. 15, the exceptional processing range setting unit 31c sets an exceptional processing range 75 near the time zone boundary in the satellite radio-controlled wristwatch 1 according to this modified example.

The exceptional processing range setting unit 31c of the satellite radio-controlled wristwatch 1 according to this embodiment is a range defined by two adjacent reference lines (the first reference line 72 and the second reference line 73), a line parallel to the line connecting the first intersection point and the second intersection point (the adjacent intersection point of the first intersection point) and passing through the first intersection point, and a line parallel to the line connecting the first intersection point and the second intersection point and passing through the second intersection point. Specifically, four exceptional processing ranges 75 are shown in the example shown in FIG. 20. The southernmost exceptional processing range 75 is a parallelogrammic range defined by a line (an interpolation line) that is parallel to the line connecting the intersection point positioned at latitude NL1, or the first intersection point, and the intersection point positioned at latitude NR1, or the second intersection point, and passes through the intersection point positioned at latitude NL1, and a line that is parallel to the interpolation line and passes through the intersection point positioned at latitude NR1. In the example shown in FIG. 20, the respective areas of the four exceptional processing ranges 75 are the same, and the respective intervals between the parallel lines are the same.

In this modified example, after determination of the time difference division region 70 to which the current position belongs and before determination of the time difference division of the current position, the exceptional processing range setting unit 31c reads in the intersection points and adjacent intersection points belonging to the time difference division region 70, and sets an exceptional processing range 75. When the position indicated by the position information 33a is inside the exceptional processing range 75, the time zone determination unit 31a maintains the time zone unchanged. Specifically, the time zone of the satellite radio-controlled wristwatch 1 is maintained unchanged when the satellite radio-controlled wristwatch 1 enters the exceptional processing range 75 across the line parallel to the linear interpolation line, and changed when the satellite radio-controlled wristwatch 1 exists from the exceptional processing range 75 across the line parallel to the linear interpolation line. Setting the exceptional processing range 75 as in this modified example enables setting of an exceptional processing range more faithful to the time zone boundary 71, as compared with a case where the exceptional processing range is set, by using a reference line and a line of latitude.

Upon execution of exceptional processing for time correction, the satellite radio-controlled wristwatch 1 according to this modified example causes the second hand 52c to point out the no-setting processing character 53d to thereby indicate that processing for the time difference division "NA" has been executed. This allows a user of the satellite radio-controlled wristwatch 1 to know that processing for a time difference division not set has been executed.

Figure 21:
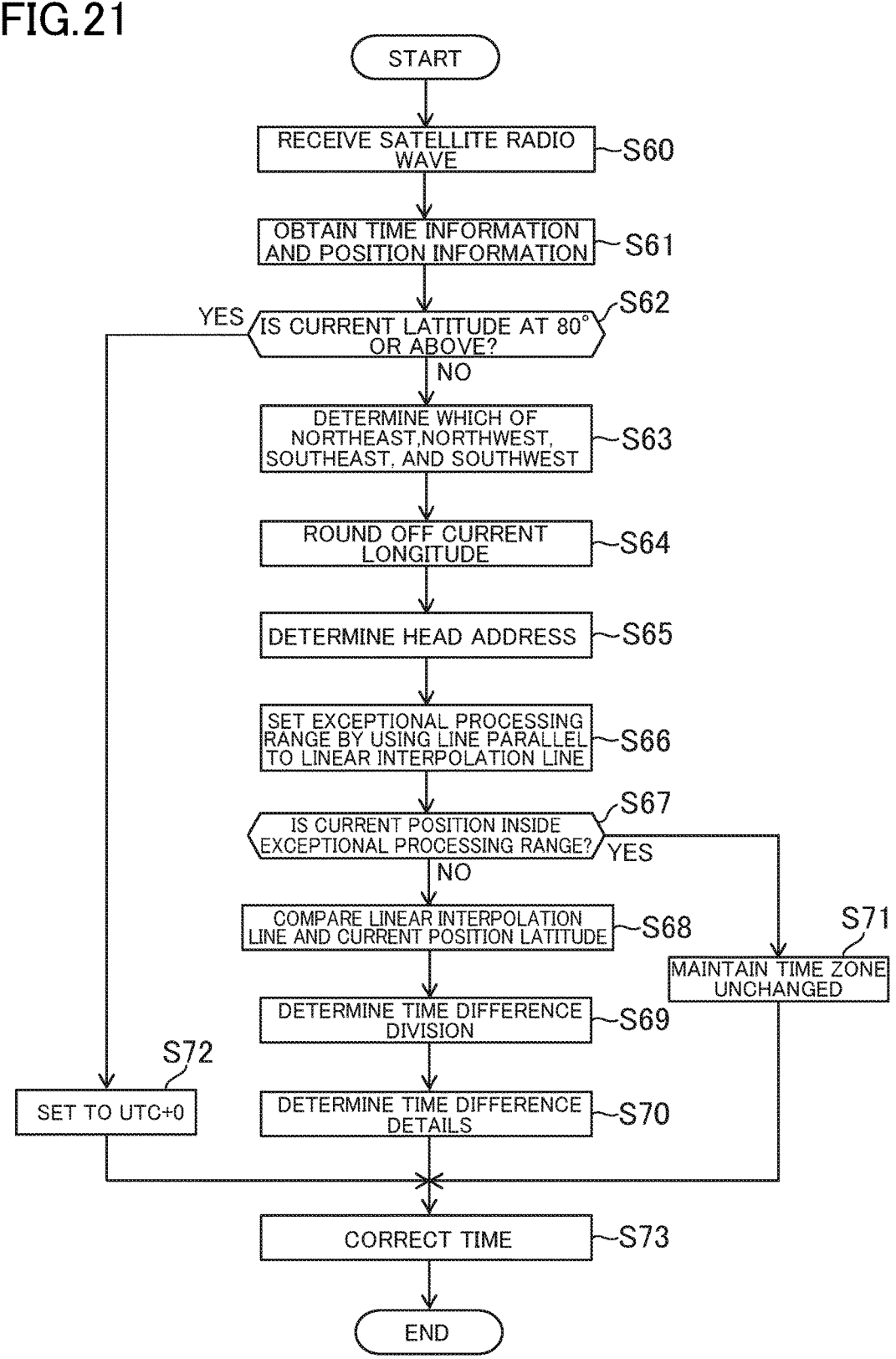
FIG. 21 is a flowchart of exceptional processing for time correction executed by a satellite radio-controlled wristwatch according to the modified example of the second embodiment of the present invention.

FIG. 21 is a flowchart of an exceptional processing for time correction by the satellite radio-controlled wristwatch 1 according to the modified example of the second embodiment of the present invention. Having received a user operation of the operational unit 60, the satellite radio-controlled wristwatch 1 according to the modified example of the second embodiment of the present invention begins time correction processing to initially receive a satellite radio wave (S60). The satellite radio-controlled wristwatch 1 then obtains the time information and the position information contained in a satellite signal and stores in the RAM 33 (S61).

Then, the time zone determination unit 31a determines whether or not the latitude of the current position indicated by the obtained position information is at 80° or above (S62). When the latitude of the current position is not at 80° or above, which of the northeastern, northwestern, southeastern, and southwestern regions the current position belongs to is determined (S63). Then, the seconds or less of the longitude of the current position are rounded to the nearest minute (S64), and which time difference division region the current position belongs to is determined.

Once the time difference division region to which the current position belongs is determined, a corresponding head address is determined (S65). Then, the exceptional processing range setting unit 31c reads in the intersection point information and the adjacent intersection point information, and sets an exceptional processing range 75, by using a line parallel to the linear interpolation line (S66).

Then, whether or not the position indicated by the position information 33a is inside the exceptional processing range 75 is determined (S67). When the current position is not inside the exceptional processing range, with reference to the time difference division and intersection point information 32b at the head address determined, the linear interpolation line is compared with the latitude of the current position, based on the intersection point information and the adjacent intersection point information (S68). Then, which linear interpolation lines the latitude of the current position is located between is determined to thereby determine the time difference division of the current position (S69). Subsequently, a time zone corresponding to the time difference division determined is determined with reference to the time difference detail information 32c. Additionally, the time difference detail determination unit 31b determines details, such as summer time and a town, on the time difference (S70).

Meanwhile, when the current position is inside the exceptional processing range, the time zone determination unit 31a decides to maintain the time zone unchanged (S71). Additionally, when the latitude of the current position is at 80° or above, the high latitude processing unit 31d sets the time zone of the current position to UTC+0 (S72). As described above, the high latitude processing unit 31d may maintain the time zone of the current position to thereby take over the time zone so far, as described above.

Thereafter, the time correction unit 31e corrects time, based on the time difference information determined (S73). This ends the exceptional processing for time correction by the satellite radio-controlled wristwatch 1 according to the modified example of the second embodiment.

Figure 22:
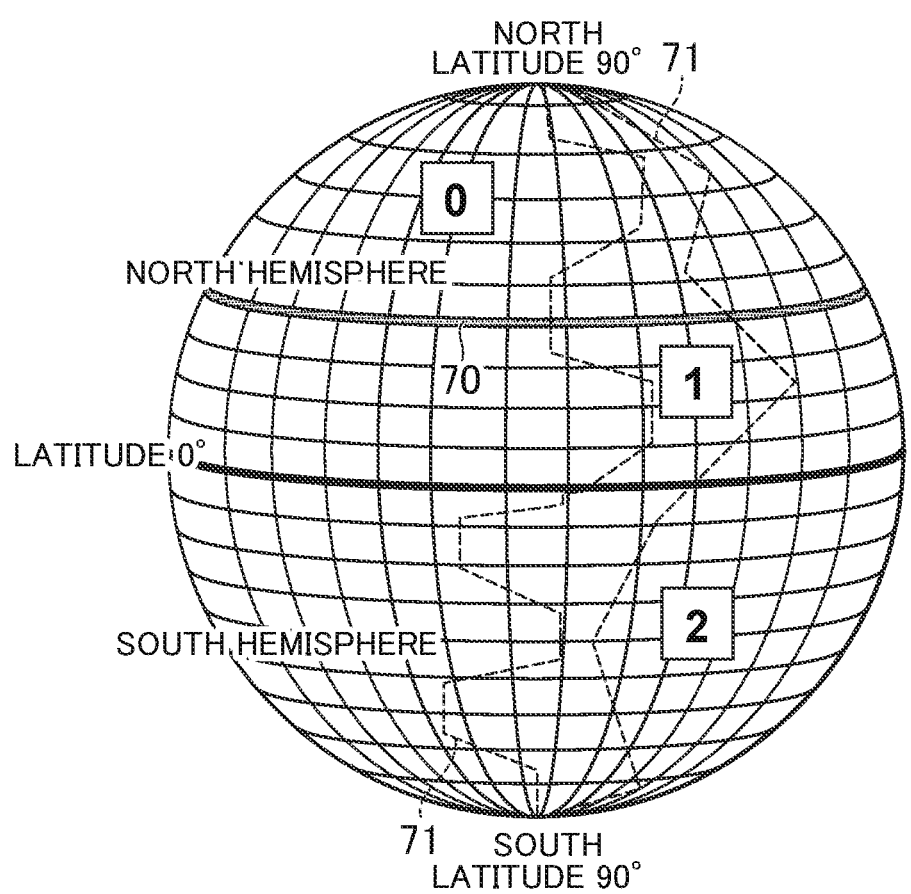
FIG. 22 is a schematic diagram showing another example of a time zone boundary and a time difference division region.

Note that embodiments of the present invention are not limited to the above described. FIG. 22 is a schematic diagram showing another example of the time zone boundary 71 and the time difference division region 70. In this example, the time difference division region 70 is defined by a reference line parallel to a specific great circle or a circle parallel to the great circle on the earth. The specific great circle is the equator here, and the circle parallel to the great circle is a line of latitude. In the case as well in which the time difference division region 70 is defined as in this example, defining a reference line for every 1 minute in the latitude direction, for example, to define the time difference division regions 70 and storing the intersection point information on an intersection point between a line of latitude and the time zone boundary 71 and also the time difference division information enables determination of a time difference, similar to the above described embodiments.

The invention claimed is:

1. A satellite radio-controlled watch, comprising:
a receiving unit for receiving a satellite radio wave containing time information and position information;
a storage unit for storing intersection point information indicating a position of an intersection point between a reference line along a line orthogonal to the equator and a single time zone boundary, and time difference division information on a wedge-shaped or belt-shaped area that is adjacent to the reference line and to which the intersection point belongs; and
a control circuit that is configured to determine a time zone in the wedge-shaped or belt-shaped area, based on the position information, the intersection point information, and the time difference division information, wherein
the reference line intersects with the single time zone boundary at a plurality of intersection points; and
the storage unit stores each latitude information of the plurality of intersection points for the reference line,
wherein the wedge-shaped or belt-shaped area is defined by two adjacent reference lines and lines cross to the reference lines.

2. The satellite radio-controlled watch according to claim 1, wherein the control circuit is configured to determine at least either one of summer time and a town based on at least the position information, the intersection point information, and the time difference division information.

3. The satellite radio-controlled watch according to claim 1, wherein the storage unit stores at least
address information containing an address indicating at least either one of the time difference division information and the intersection point information for the reference line, and
time difference division and intersection point information containing the time difference division information and the intersection point information for the reference line to which the time difference division information and the intersection point information belong, which can be referred to by using the address.

4. The satellite radio-controlled watch according to claim 3, wherein the storage unit stores adjacent intersection point information that makes a pair with the intersection point information.

5. The satellite radio-controlled watch according to claim 3, wherein
the address is a head address of the time difference division information and the intersection point information for the reference line to which the time difference division information and the intersection point information belong, and
the time difference division and intersection point information contains a reference mark indicating an end of data for the reference line to which the time difference division and intersection point information belongs.

6. The satellite radio-controlled watch according to claim 1, wherein the storage unit stores time difference detail information containing time zone information and at least either one of summer time information and town information associated with the time difference division information.

7. The satellite radio-controlled watch according to claim 1, wherein the area is defined by two adjacent reference lines and lines orthogonal to the reference lines.

8. The satellite radio-controlled watch according to claim 7,
wherein the control circuit sets a range as an exceptional processing range, the exceptional processing range containing the intersection point, and defined by two adjacent reference lines and lines apart from each other by a predetermined distance and orthogonal to the two reference lines, and
wherein the control circuit maintains the time zone applied to the one area when a position indicated by the position information is changed from the one area to the exceptional processing range, the exceptional processing range being different from the one area.

9. The satellite radio-controlled watch according to claim 1, wherein the control circuit determines whether to maintain the time zone unchanged or to set a specific time zone when the time zone information associated with the time difference division information indicates a time zone not set.

10. The satellite radio-controlled watch according to claim 1, wherein the control circuit maintains the time zone as unchanged or sets a specific time zone when a position indicated by the position information is at a predetermined latitude or above.

11. The satellite radio-controlled watch according to claim 1, wherein
the position information includes first position information which is position information on a first direction and second position information which is position information on a second direction that is perpendicular to the first direction, and
the control circuit (i) determines an area where the satellite radio-controlled watch is located based on the time difference division information and the first position information, and (ii) determines the time zone in the area where the satellite radio-controlled watch is located based on the second position information and the intersection information.

12. The satellite radio-controlled watch according to claim 1, wherein the wedge-shaped or belt-shaped area is an area extending over 0° to 90° north latitude or an area extending over 0° to 90° south latitude.

13. The satellite radio-controlled watch according to claim 1, wherein the intersection point used for determining the time zone is one of the plurality of intersection points.

14. A satellite radio-controlled watch, comprising:
a receiving unit for receiving a satellite radio wave containing time information and position information;
a storage unit for storing (i) first intersection point information indicating a position of a first intersection point that is an intersection point between a first reference line and a time zone boundary, the first reference line extending i) along a great circle orthogonal to a specific great circle around the earth or ii) along the specific great circle around the earth or a circle parallel to the specific great circle, and (ii) time difference division information on a wedge-shaped or belt-shaped area that is adjacent to the reference line and to which the intersection point belongs; and
a control circuit that is configured to: (i) determine a time zone in one area, based on the position information, the first intersection point information, and the time difference division information, (ii) set a range as an exceptional processing range which is different from the one area, and (iii) when a position of the satellite radio-controlled watch indicated by the position information is changed from the one area to the exceptional processing range, maintain the time zone applied to the one area,
wherein
the storage unit stores second intersection point information indicating a position of a second intersection point that is an intersection point between the time zone boundary and a second reference line adjacent to the first reference line, wherein the second intersection point information is associated with the first intersection point information, and
the exceptional processing range is defined by the first reference line, the second reference line, and a line connecting the first intersection point and the second intersection point.

15. The satellite radio-controlled watch according to claim 14, wherein the line connecting the first intersection point and the second intersection point is orthogonal to the first reference line and the second reference line.

16. A satellite radio-controlled watch, comprising:
a receiving unit for receiving a satellite radio wave containing time information and position information;
a storage unit for storing (i) first intersection point information indicating a position of a first intersection point that is an intersection point between a first reference line and a time zone boundary, the first reference line extending i) along a great circle orthogonal to a specific great circle around the earth or ii) along the specific great circle around the earth or a circle parallel to the specific great circle, and (ii) time difference division information on a wedge-shaped or belt-shaped area that is adjacent to the reference line and to which the intersection point belongs; and
a control circuit that is configured to: (i) determine a time zone in one area, based on the position information, the first intersection point information, and the time difference division information, (ii) set a range as an exceptional processing range which is different from the one area, and (iii) when a position of the satellite radio-controlled watch indicated by the position information is changed from the one area to the exceptional processing range, maintain the time zone applied to the one area, wherein
the storage unit stores second intersection point information indicating a position of a second intersection point that is an intersection point between the time zone boundary and a second reference line adjacent to the first reference line, wherein the second intersection point information is associated with the first intersection point information,
the exceptional processing range is defined by the first reference line, the second reference line, and a line connecting the first intersection point and the second intersection point, and
the control circuit further sets another exceptional processing range that is defined by the first reference line, the second reference line and a line parallel to the line connecting the first intersection point and the second intersection point and passing through the first intersection point, and a line parallel to the line connecting the first intersection point and the second intersection point and passing through the second intersection point.

* * * * *